(12) United States Patent
Harris et al.

(10) Patent No.: US 9,108,167 B2
(45) Date of Patent: *Aug. 18, 2015

(54) REACTIVE FUNCTIONAL GROUP-MODIFIED MOLECULARLY SELF-ASSEMBLING MATERIAL

(75) Inventors: William J. Harris, Lake Jackson, TX (US); Pushkala Krishnamurthy, Pearland, TX (US); Scott T. Matteucci, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 72 days.

This patent is subject to a terminal disclaimer.

(21) Appl. No.: 13/992,084

(22) PCT Filed: Dec. 20, 2011

(86) PCT No.: PCT/US2011/066104
§ 371 (c)(1),
(2), (4) Date: Jun. 6, 2013

(87) PCT Pub. No.: WO2012/088081
PCT Pub. Date: Jun. 28, 2012

(65) Prior Publication Data
US 2013/0269520 A1    Oct. 17, 2013

Related U.S. Application Data

(60) Provisional application No. 61/424,738, filed on Dec. 20, 2010.

(51) Int. Cl.
| | | |
|---|---|---|
| B01D 71/56 | (2006.01) | |
| B01D 53/22 | (2006.01) | |
| B01D 67/00 | (2006.01) | |
| B01D 71/76 | (2006.01) | |
| C08G 18/60 | (2006.01) | |
| C08G 18/71 | (2006.01) | |
| C08G 18/81 | (2006.01) | |
| C08G 69/44 | (2006.01) | |
| C08G 69/46 | (2006.01) | |
| C08G 69/48 | (2006.01) | |
| B01D 71/48 | (2006.01) | |
| B01D 71/54 | (2006.01) | |
| B01D 71/70 | (2006.01) | |

(52) U.S. Cl.
CPC .............. *B01D 71/56* (2013.01); *B01D 53/228* (2013.01); *B01D 67/0006* (2013.01); *B01D 71/76* (2013.01); *C08G 18/606* (2013.01); *C08G 18/718* (2013.01); *C08G 18/8116* (2013.01); *C08G 69/44* (2013.01); *C08G 69/46* (2013.01); *C08G 69/48* (2013.01); *B01D 71/48* (2013.01); *B01D 71/54* (2013.01); *B01D 71/70* (2013.01); *B01D 2323/30* (2013.01)

(58) Field of Classification Search
CPC .. B01D 53/228; B01D 67/0093; B01D 71/44; B01D 71/48; B01D 71/54; B01D 71/56; B01D 71/70; B01D 71/76; B01D 2323/30; B01D 67/0006; C08G 18/606; C08G 18/718; C08G 18/8116; C08G 69/44; C08G 69/46; C08G 69/48
USPC .................. 95/45, 49, 51; 96/4, 14; 525/431, 525/440.03, 440.071, 440.12, 437, 452
See application file for complete search history.

(56) References Cited

U.S. PATENT DOCUMENTS

| | | |
|---|---|---|
| 6,172,167 B1 | 1/2001 | Stapert et al. |
| 2008/0214743 A1 | 9/2008 | Broos et al. |
| 2008/0241528 A1 | 10/2008 | Broos et al. |
| 2010/0029860 A1* | 2/2010 | Honma et al. ................. 525/452 |
| 2010/0041857 A1 | 2/2010 | Harris et al. |
| 2010/0093971 A1 | 4/2010 | Harris et al. |
| 2010/0126341 A1 | 5/2010 | Matteucci et al. |

* cited by examiner

Primary Examiner — Jason M Greene

(57) ABSTRACT

The present invention generally relates to a reactive functional group-modified molecularly self-assembling material; method of making the reactive functional group-modified molecularly self-assembling material; manufactured article comprising the reactive functional group-modified molecularly self-assembling material; and a method of shaping the reactive functional group-modified molecularly self-assembling material.

7 Claims, No Drawings ic # REACTIVE FUNCTIONAL GROUP-MODIFIED MOLECULARLY SELF-ASSEMBLING MATERIAL

PRIORITY

This application claims priority to U.S. Provisional Application 61/424,738, filed Dec. 20, 2010, and PCT Patent Application Number PCT/US2011/066104, filed Dec. 20, 2011.

BACKGROUND

1. Field of the Invention

The present invention generally relates to an organic polymer composition and article and methods of preparing and using same.

2. Background Art

A molecularly self-assembling (MSA) material has been used to prepare, among other things, hot melt adhesives, and composites comprising the MSA material and a filler. See, for example, U.S. Pat. No. 6,172,167 B1 and US 2008/0214743 (separately and generally related to, among other things, a MSA polyesteramide and process for producing same); US 2008/0241528 A1 (generally related to, among other things, polyesteramide based hot melt adhesives); US 2010/0041857 (generally related to, among other things, an in situ synthesis of MSA polyesteramide); US 2010/0093971 (generally related to, among other things, polyesteramides with decreased perfection of the amide); and US 2010/0126341 A1 (generally related to, among other things, a polymer pi-bond philic filler composite, including a membrane prepared therefrom). The art has not contemplated a MSA material further containing a covalently bound reactive or derivatized functional group.

BRIEF SUMMARY OF THE PRESENT INVENTION

The inventors have recognized that molecularly self-assembling (MSA) material is valuable because even at low number average molecular weight (e.g., $M_n$<30,000 grams per mole (g/mol)) the MSA material uncommonly combines low dynamic viscosity (i.e., zero shear viscosity) and high processability in a neat melt (or solution) phase (e.g., in extrusions, for a given acceptable viscosity, at lower temperatures than temperatures of non-MSA materials) with solid state mechanical properties (e.g., at least one of solvent resistance, tensile strength, toughness, and percent elongation to break) that are improved over or comparable to such mechanical properties of non-MSA organic polymers having much higher $M_n$ (e.g., >50,000 g/mol). However when trying to use the MSA material for certain applications (e.g., semipermeable membranes), the inventors found it desirable but difficult to conceive of or prepare useful functionalized analogs thereof, which would be useful for purposely altering application performance. This invention solves this problem by providing reactive functionalized analogs of MSA materials, manufactured articles comprising same, and methods of making and using them. The inventors discovered that the reactive functionalized analogs of MSA materials are useful for modulating (i.e., purposefully altering) chemical reactivity of the MSA material and preparing derivatized MSA products having altered performance and enabling new applications or performance.

In a first embodiment the present invention provides a reactive functional group-modified MSA material comprising at least one reactive functional group covalently bonded to a MSA material; wherein each reactive functional group is supplementary to the MSA material (i.e., is in addition to any reactive functional group residual (carried through) from the MSA material) and independently is derived from a reaction of a premodification MSA material (i.e., an MSA material lacking the at least one reactive functional group) with a polyfunctional reactant comprising first- and second-reacting functional groups, wherein the reaction has formed the covalent bond between the premodification MSA material and the first-reacting functional group of the polyfunctional reactant; and the polyfunctional reactant is not the premodification MSA material or a monomer therefor.

A "monomer" for the MSA material means a molecule from which a repeat unit of the MSA material is formally derived or a molecule that can be used to build molecular weight thereof via a monomer exchange reaction (e.g., transesterification) or condensation reaction.

As used herein, the term "reactive functional group" means a supplementary or auxiliary moiety ("supplementary reactive functional group") that is residual from the polyfunctional reactant and not from the premodification MSA material, the reactive functional group having a reacted portion that has covalently bonded to the premodification MSA material and a reactive portion that is, or is derived from, the second-reacting functional group of the polyfunctional reactant, wherein the supplementary or auxiliary moiety is characterizable as enabling at least one of crosslinking, end-capping derivatization, and chain-extending of the MSA material; wherein the crosslinking preferably is performed with a crosslinking effective amount of a promoter (e.g., polymerization catalyst, curing agent, initiator, heat, or ultraviolet (UV) light) so as to form a crosslinked MSA material (as a network polymer), the end capping is performed by reacting a derivatizing molecule (e.g., fatty acid or alcohol or photoluminescent tag molecule) with the reactive portion of the reactive functional group-modified MSA material so as to form an end-capped derivatized-MSA material, and the chain extending is performed by reacting a derivatizing monomer or polymer (e.g., coupling) with the reactive portion of the reactive functional group-modified MSA material so as to form a chain extended MSA material (e.g., having a higher molecular weight), wherein the chain extended MSA material is characterizable as being a block, segmented, graft, comb, or dendrimer (co)polymer. The derivatizing molecule, monomer, and polymer are collectively referred to herein as derivatizing agents. The crosslinked, end-capped derivatized, and chain extended MSA materials are collectively referred to herein as derivatized MSA products, each of which comprise at least one derivatized functional group (different than the reactive functional group) covalently bound to the MSA material. The derivatized MSA products and reactive functional group-modified MSA material are collectively referred to herein as invention compositions. The first- and second-reacting functional groups of the polyfunctional reactant are the same as, or in other embodiments are different than, each other. The second-reacting functional group of the polyfunctional reactant provides (directly or indirectly) the reactive portion of the reactive functional group bonded to the MSA material. The second-reacting functional group of the polyfunctional reactant and the reactive portion of the reactive functional group preferably are the same as each other (i.e., preferably the second-reacting functional group is carried through the reaction unchanged). Nevertheless, second-reacting functional groups also include protected derivatives (i.e., masked forms) thereof that can be converted later into the reactive portion of the reactive functional group. The reactive portion thereof is useful in the crosslinking, end capping derivatization, or chain extending processes. In some embodiments the reactive functional group-modified MSA material also contains at least one other reactive functional group (e.g., HOCH$_2$—) in addition to the reactive functional group(s), wherein the other reactive functional groups are residuals of the premodification MSA material that have been carried through the reaction of the premodification MSA material with the polyfunctional reactant.

The premodification MSA material (i.e., the MSA material prior to covalent bonding to the at least one reactive functional group) is an oligomer or polymer comprising repeat units of formula

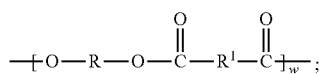

and at least one second repeat unit selected from the group consisting of the ester-amide repeat units of Formula II and III and V:

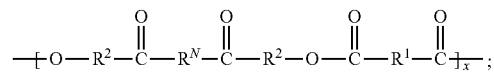

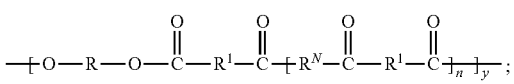

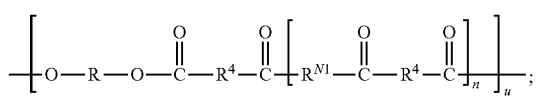

and the ester-urethane repeat unit of Formula IV:

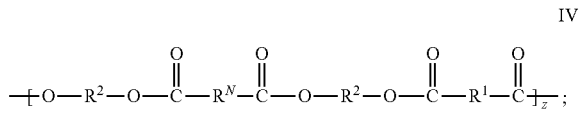

or combinations thereof wherein: R is at each occurrence, independently a non-aromatic (C$_2$-C$_{20}$)hydrocarbylene group, a non-aromatic (C$_2$-C$_{20}$)heterohydrocarbylene group, or a polyalkylene oxide group having a group molecular weight of from about 100 grams per mole to about 5000 grams per mole; R$^1$ at each occurrence independently is a bond or a non-aromatic (C$_1$-C$_{20}$)hydrocarbylene group or an aromatic (C$_6$-C$_{20}$)hydrocarbylene group (e.g., 1,4-phenylene or 4,4'-diphenylenemethane) or a phenylene-[het]-phenylene wherein [het] independently is a heteroatom linker O, S, S(O), S(O)$_2$, or N(R$^3$) (preferably [het] is O, S(O)$_2$, or N(R$^3$)); R$^2$ at each occurrence independently is a non-aromatic (C$_1$-C$_{20}$)hydrocarbylene group; R$^N$ is —N(R$^3$)—Ra—N(R$^3$)—, where R$^3$ at each occurrence independently is H or a (C$_1$-C$_6$) alkyl and Ra is a non-aromatic (C$_2$-C$_{20}$)hydrocarbylene group, or R$^N$ is a (C$_2$-C$_{20}$)heterocycloalkyl group containing the two nitrogen atoms, wherein each nitrogen atom is bonded to a carbonyl group according to formula (III) above; R$^{N1}$ is —N(R$^3$)—Rb—N(R$^3$)—, where R$^3$ at each occurrence independently is H or a (C$_1$-C$_6$)alkyl, and Rb is an aromatic (C$_6$-C$_{20}$)hydrocarbylene group or non-aromatic (C$_2$-C$_{20}$)hydrocarbylene group or a phenylene-[het]-phenylene wherein [het] is as defined above; or R$^{N1}$ is a (C$_2$-C$_{20}$)heterocycloalkylene group containing two ring nitrogen atoms that are bonded to different carbonyl groups in formula (V) (e.g., R$^{N1}$ is piperazin-1,4-diyl); R$^4$ at each occurrence independently is an aromatic (C$_6$-C$_{20}$)hydrocarbylene group; n is at least 1 and has a mean value less than 3; and w represents the ester mol fraction of Formula I, and u, x, y and z represent the amide or urethane mole fractions of Formulas V, II, III, and IV, respectively, where w+u+x+y+z=1, and 0<w<1, and at least one of u, x, y and z is >zero but <1, wherein the oligomer or polymer comprises at least one active hydrogen-containing functional group comprising a carbon-based hydroxyl (C—OH) group, C—N(H)—C group, or C—NH$_2$ group, wherein an active hydrogen atom of the active hydrogen-containing functional group is replaced in the reaction by the residual from the polyfunctional reactant. Examples of the active hydrogen-containing functional group are HOCH$_2$—, —CO$_2$H, —CH$_2$N(H)CH$_2$—, —C(O)N(H)—C, —CH$_2$NH$_2$, and —C(O)NH$_2$. Preferably, the active hydrogen-containing functional group is —CO$_2$H, more preferably —CH$_2$NH$_2$, and still more preferably HOCH$_2$—. Each carbon-based hydroxyl or —NH$_2$ group typically is derived from an end residual of a polyfunctional monomer containing at least two (usually two) carbon-based hydroxyl or —NH$_2$ groups; or from an internal residual of a polyfunctional monomer containing at least three carbon-based hydroxyl or —NH$_2$ groups; or a combination thereof; wherein the polyfunctional monomer has been used to prepare the MSA material.

In a second embodiment the present invention provides a process for preparing the reactive functional group-modified MSA material, the process comprising contacting under reaction effective conditions the premodification MSA material with the polyfunctional reactant in such a way so as to prepare the reactive functional group-modified MSA material.

The process of reacting the first-reacting functional group of the polyfunctional reactant with the premodification MSA material to prepare the reactive functional group-modified MSA material and the processes of crosslinking, end capping, and chain extending the reactive functional group-modified MSA material independently are performed under "reaction effective conditions" of temperature and pressure that preferably comprise a temperature of from −80 degrees Celsius (° C.) to 300° C. and a pressure of from 50 kilopascals (kPa) to 200 kPa. A temperature of from 20° C. to a temperature 40° C. above the glass transition temperature (T$_g$) or melting temperature (T$_m$, if applicable) of the premodification MSA material and a pressure of from 50 kPa to 110 kPa are more preferred. The invention contemplates using lower pressures (e.g., down to 0.01 kPa) if desired to drive equilibrium reactions to completion by removing any volatile by-products, solvents, reactants, and the like. Preferably, the reaction effective conditions further comprise a polar solvent (e.g., tertiary-butanol), preferably an anhydrous polar aprotic solvent (e.g., acetonitrile, chloroform, ethylene glycol dimethyl ether, or tetrahydrofuran) and maximum temperature is the boiling point of the polar solvent. If desired, the reaction conditions can further comprise a catalytically effective amount of a catalyst suitable for catalyzing a particular process (e.g., Lewis acid or organotin compound when the first-reacting functional group is an isocyanato moiety (—N═C═O).

In a third embodiment the present invention provides a manufactured article comprising a shaped form of the reactive functional group-modified MSA material or shaped form of the derivatized MSA product. In some embodiments the manufactured article comprises an adhesive, film, membrane, or other fabricated article. In other embodiments the adhesive can be applied so as to form a layer between and in physical contact with two solid articles capable of reacting with the reactive functional groups, and the layer can then be cured so as to prepare an adhered multicomponent manufactured article.

In a fourth embodiment the present invention provides a shaping process for preparing the manufactured article, the shaping process comprising shaping a melt (optionally containing a liquid plasticizer) of the reactive functional group-modified MSA material or derivatized MSA product or shaping a solution of the reactive functional group-modified MSA material or derivatized MSA product dissolved in a solvent to respectively give a shaped melt or shaped solution of the reactive functional group-modified MSA material or derivatized MSA product, and allowing the shaped melt to solidify (e.g., upon cooling) or the liquid plasticizer or solvent to separate out so as to prepare the manufactured article.

The present invention also provides a process for preparing a crosslinked reactive functional group-modified MSA material, the process comprising contacting the reactive functional group-modified MSA material under curing effective conditions with a crosslinking effective amount of a promoter in such a way so as to crosslink molecules of the reactive functional group-modified MSA material and prepare the crosslinked functional group-modified MSA material. Thus, in some embodiments the manufactured article can be cured so as to prepare a cured manufactured article, e.g., a cured semipermeable membrane.

The reactive functional group-modified MSA material and shaping process are useful for modulating chemical reactivity (e.g., adding a "synthetic handle" to the premodification MSA material, branching the premodification MSA material, or both), enabling new applications for an MSA material, or altering performance (e.g., advancing $M_n$, crosslinking, or both) compared to performance of an MSA material. The reactive functional group-modified MSA material is useful for preparing the derivatized MSA products, which are both useful for preparing their respective manufactured articles. The reactive functional group-modified MSA material and derivatized MSA products enable useful applications, including new applications that could not be achieved or achieved as successfully with the premodification MSA material. For example, the reactive functional group-modified MSA material and derivatized MSA products have higher $M_n$ or different chemical reactivity or performance than those of the premodification MSA materials. In some embodiments reactive functional group-modified MSA material and derivatized MSA products are useful for preparing a manufactured article comprising a semipermeable membrane (described later) that is useful for sweetening of flue or natural gas. Remarkably, if desired the curable or cured manufactured article can be prepared from a premodification MSA material having a number average molecular weight ($M_n$) that is very low (e.g., $M_n$<12,000 g/mol) or even ultra low ($M_n$<5,000 g/mol), and such a curable or cured manufactured article can still function as, for example, a semipermeable membrane having high acid gas permeability and selectivity and, at least for the cured manufactured article, good resistance to plasticization (e.g., acid gas induced plasticization).

Additional embodiments are described in the remainder of the specification, including the claims.

DETAILED DESCRIPTION OF THE PRESENT INVENTION

The embodiments of the present invention summarized previously and the Abstract are incorporated here by reference. The "carbon-based hydroxyl" is a characteristic moiety of carboxylic acids, alcohols, and phenols (i.e., comprises the C—OH). The term "chain extended" means a covalent bond joins adjacent polymer chains so as to form a linear or branched polymer chain. Each covalent bond independently is formed from direct or indirect (via a coupling agent) reaction between two end groups, each on different the polymer chains. When a covalent bond forms between two end groups, at least one end group has capability of reacting to form at least two covalent bonds or, when the two end groups react via a coupling agent, the coupling agent has capability of reacting to form at least three covalent bonds or, when the two end groups react via a coupling agent at least one end group has the capability to form at least two covalent bonds. The phrase "crosslinking effective amount" means a quantity sufficient to form covalent bonds under the circumstances (e.g., circumstances such as curing effective conditions and particular materials employed). The reactive functional group-modified MSA material is curable. The phrase "curing effective conditions" means circumstances comprising temperature and pressure that preferably comprise a pressure of from 100 kilopascals (kPa) to 200 kPa and a temperature of from 0 degrees Celsius (° C.) to a temperature less than the glass transition temperature ($T_g$) or melting temperature ($T_m$, if applicable) of the premodification MSA material. If desired, the curing conditions can further comprise a crosslinking effective amount (preferably a sub-stoichiometric amount) of a curing catalyst suitable for catalyzing the curing process as described later. Preferably, the curing effective conditions comprise ambient pressure (e.g., 101 kPa) and lack the curing catalyst. The term "liquid plasticizer" means a substance that functions in such a way so as to enable a solid phase of the reactive functional group-modified MSA material or derivatized MSA product to be shaped without fracture at a temperature below boiling point of the substance. The term "manufactured article" means a member of a class of things, wherein the member is not found in nature. The term "melt" means a ductile phase of material that can be plastically deformed without fracture, wherein the ductile phase comprises at least most, and preferably consists essentially of all, of the material as a liquid. Preferably, the polyfunctional reactant has at most 4, more preferably at most 3, and still more preferably at most 2 reactive functional groups. As described later, a single reactive functional group independently is reactive for forming from 1 to 3 covalent bonds with same or different molecule(s) of the derivatizing agent(s). The term "separate out" means a phase separation or being physically removed from. The term "shaped" means any form of a three-dimensional configuration. The term "shaping" means forming the three-dimensional configuration. Unless otherwise stated, references mentioned herein are incorporated herein by reference.

Alternative embodiments: where the present invention, or any portion thereof (e.g., element or step), is defined in the alternative by a group having two or more members (e.g., Markush group), this application is written so that such preferred embodiments are readily determined following instruction (i) or (ii): (i) select any single member of the group, thereby limiting the group to the selected single member; or (ii) delete any single member from the group, thereby limiting the group to the remaining member(s) thereof. In some embodiments the member that is selected is based on one of the Examples or other species described herein and the member that is deleted is based on a prior art species.

Numerical ranges: any lower limit of a range of numbers, or any preferred lower limit of the range, may be combined with any upper limit of the range, or any preferred upper limit of the range, to define a preferred aspect or embodiment of the range. Unless otherwise indicated, each range of numbers includes all numbers, both rational and irrational numbers, subsumed in that range (e.g., "from 1 to 5" includes, for example, 1, 1.5, 2, 2.75, 3, 3.81, 4, and 5).

Regarding reactive functional groups that have been derived from different polyfunctional reactant molecules (each molecule being the same or different), preferably, each such reactive functional group of the reactive functional group-modified MSA material is covalently bonded to a different non-hydrogen atom of the MSA material. Also, preferably $M_n$ of the reactive functional group-modified MSA material is higher than $M_n$ of the premodification MSA material. In some embodiments the reactive functional group enables the crosslinking; end capping; or chain-extending (e.g., coupling), all of the MSA material to give the derivatized MSA product. The $M_n$ of the derivatized MSA products are higher than $M_n$ of their corresponding reactive functional group-modified MSA materials. In the case of crosslinked MSA materials, some portion thereof would not dissolve in a solvent (e.g., chloroform) as compared to the premodification MSA material, which non-dissolving portion or fraction is often described as "gel fraction."

The first-reacting functional group of the polyfunctional reactant is capable of forming a covalent bond with the oxygen atom or the nitrogen atom of the active hydrogen-containing functional group of the premodification MSA material. The second-reacting functional group of the polyfunctional reactant provides the reactive portion of the reactive functional group, wherein the reactive portion is a moiety that is capable of reacting, under reaction effective conditions, with the derivatizing molecule, monomer, polymer (e.g., a hydroxyl group of another MSA material), another reactive functional group on the same or different molecule of MSA material, or a combination thereof in such a way so as to give the derivatized MSA product. Preferably stoichiometry is such that moles of the first-reacting functional group of the polyfunctional reactant to the total number of moles of carbon-based hydroxyl groups plus —NH$_2$ groups, more preferably to total number of moles of —CH$_2$OH groups plus —NH$_2$ groups, of the premodification MSA material is 1:1. Typically, the reaction is performed with a stoichiometry or molar ratio of moles of the polyfunctional reactant to moles of the premodification MSA material of from 1:1 to 4:1, and more preferably 1.8:1 to 3.2:1, still more preferably 1.9:1 to 2.2:1; and even more preferably 2:1.

In some embodiments at least one, and preferably each, reactive portion of the reactive functional group-modified MSA material is a reactive silane functional group, and the reactive functional group-modified MSA material comprises a reactive silane-modified molecularly self-assembling material comprising at least one halo-silyl or oxy-silyl containing functional group that is covalently bonded to the MSA material. Preferably, each halo-silyl or oxy-silyl containing functional group independently is a formal radical group of formula (A):

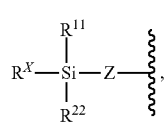

(A)

wherein ⌇ indicates the radical; each of $R^{11}$ and $R^{22}$ independently is $R^X$, $(C_1-C_{40})$hydrocarbyl, or $(C_1-C_{40})$heterohydrocarbyl; each $R^X$ independently is halo, $(C_1-C_{40})$hydrocarbyl-O—, $(C_1-C_{40})$heterohydrocarbyl-O—, $(C_1-C_{40})$hydrocarbyl-C(O)O—, or $(C_1-C_{40})$heterohydrocarbyl-C(O)O—; and Z is a covalent bond (i.e., Z is absent), $(C_1-C_{40})$hydrocarbylene, or $(C_1-C_{40})$heterohydrocarbylene. The $R^{11}R^{22}R^XSi$— moiety comprises the reactive portion of the group of formula (A).

The halo-silyl and oxy-silyl containing functional groups can be characterized as being reactive with a molar excess of water (hydrolysis) at 100° C., preferably 50° C., and more preferably 25° C. in such a way so as to prepare the crosslinked silane-modified MSA material. Preferably, the contacting is with water vapor from deionized water either in ambient air (e.g., 50% relative humidity air) for 7 days at about 25° C. or the contacting is with the water vapor is at 50° C. for 60 hours.

Generally for preparing the crosslinked silane-modified MSA material, the halo-silyl and oxy-silyl containing functional groups of the reactive silane-modified MSA material are contacted with a curing agent, preferably a polysilanol (e.g., a polysilanol having $M_n<1,000$ g/mol), or water (hydrolysis), and more preferably a molar excess of water, at a temperature of from 0° C. to 200° C., preferably <100° C., and more preferably between 50° C. and 10° C., in such a way so as to prepare the crosslinked silane-modified MSA material. When the premodification MSA material has been end-capped with the halo-silyl and oxy-silyl containing functional groups the crosslinked silane-modified MSA material is the chain-extended silane-modified MSA material. Preferably, the crosslinking reaction is run for a period of time of from 1 minute to 1 month (e.g., 10 minutes to 24 hours). The contacting can be performed by any suitable means including, for example, contacting the halo-silyl and oxy-silyl containing functional groups with vapor of the curing agent (e.g., water vapor) or immersing the reactive silane-modified MSA material in liquid curing agent (e.g., liquid water). In some embodiments the process employs a catalytically effective amount (preferably a sub-stoichiometric amount) of a curing catalyst to halo-silyl and oxy-silyl containing functional groups to accelerate hydrolysis, silanolysis, as well as silanol condensation. Examples of such curing catalysts are acids, bases (e.g., triethylamine or sodium hydroxide), organic titanates, zirconates, and metal carboxylate salts wherein the metal is a cation of lead, cobalt, iron, nickel, zinc, or tin. Examples of the acids are Brønsted acids (e.g., acetic acid, methanesulfonic acid, para-toluenesulfonic acid, and trifluoromethanesulfonic acid) and Lewis acids (dialkyl tindicarboxylates and titanium tetrachloride). The halo-silyl group can also be contacted with an alcohol (e.g., $(C_1-C_{40})$alkanols) or polyol using the aforementioned contacting conditions so as to prepare an uncrosslinked silane-modified MSA material comprising oxy-silyl groups.

Preferably, the reactive silane-modified MSA material used to prepare the crosslinked silane-modified MSA material has an average of at least 2 $R^X$ groups per molecule. Total number of $R^X$ groups per molecule would also depend on average number of formal radical groups of formula (A) per molecule. For example, in embodiments where there are an average of two formal radical groups of formula (A) per molecule of reactive silane-modified MSA material, and each of $R^{11}$ and $R^{22}$ independently is $R^X$ in the formal radical groups of formula (A), there is an average of 6 $R^X$ groups per molecule of reactive silane-modified MSA material. Such embodiments employing an average of 6 $R^X$ groups per molecule of reactive silane-modified MSA material are particularly useful for preparing crosslinked silane-modified MSA material. When there are an average of 2 $R^X$ end groups per molecule of reactive silane-modified MSA material (e.g., there are an average of 2 formal radical groups of formula (A) per molecule and each of $R^{11}$ and $R^{22}$ independently is not $R^X$), curing such a reactive silane-modified MSA material results mostly in the chain extended silane-modified MSA material and a minor amount of crosslinked silane-modified MSA material.

The reactive silane-modified MSA material can be prepared by any suitable process. In some embodiments the process comprises contacting under reaction effective conditions the premodification MSA material with a halo-silyl or oxy-silyl-containing reactant in a polar aprotic solvent in such a way so as to prepare the reactive silane-modified MSA material, wherein the halo-silyl or oxy-silyl-containing reactant is a compound of formula (B):

(B)

wherein $R^{11}$, $R^{22}$, and $R^X$ are as defined previously for formula (A); and Y is a linking group or leaving group, wherein the leaving group can be displaced by a nucleophile (Nu) so as to form a covalent bond between Nu and the Si from formula (B) (e.g., as in Y is H in a hydrosilation reaction with a C=C (e.g., allyl end-capped terminal hydroxyls of a premodification MSA material)); and wherein the linking group contains at least one first reacting functional group capable of forming a direct or indirect (e.g., via a coupling agent residual) covalent bond to the premodification MSA material. The $R^{11}R^{22}R^XSi$— moiety comprises the second-reacting functional group and the —Y moiety comprises the first-reacting functional group of the compound of formula (B), which is an example of the polyfunctional reactant. In some embodiments the linking group (Y) is a first reacting functional group of formula (A1): —$(C_1-C_{10})$hydrocarbylene-SiR$^X$R$^{11}$R$^{22}$, wherein $R^X$, $R^{11}$ and $R^{22}$ independently are as defined for formula (A). The compound of formula (B) wherein each of $R^{11}$ and $R^{22}$ independently is $R^X$ is a compound of formula (B-1)_$(R^X)_3$Si—Y (B-1), wherein the $(R^X)_3$Si— moiety is a single reactive functional group that is reactive for forming up to 3 covalent bonds to the same or different molecule(s). If desired, unused reactive capacity of the $(R^X)_3$Si moiety can be quenched by, for example, reacting with water.

The reaction effective conditions for preparing the reactive silane-modified MSA material include temperature and pressure that preferably comprise a temperature of from −80 degrees Celsius (° C.) to 300° C. and a pressure of from 50 kilopascals (kPa) to 200 kPa. A temperature of from 20° C. to a temperature 40° C. above the glass transition temperature ($T_g$) or melting temperature ($T_m$, if applicable) of the premodification MSA material and a pressure of from 50 kPa to 110 kPa are more preferred. Preferably, the reaction effective conditions further comprise a polar solvent (e.g., tertiary-butanol), preferably an anhydrous polar aprotic solvent (e.g., acetonitrile, chloroform, ethylene glycol dimethyl ether, or tetrahydrofuran) and maximum temperature is the boiling point of the polar solvent. A catalytically effective amount of a coupling catalyst may be used. Preferably when Y contains an isocyanato moiety, in some embodiments in order of increasing preference, the coupling catalyst comprises a Lewis acid; organotin compound; dibutyltin maleate or dibutyltin diacetate; or dibutyltin dilaurate. After the coupling reaction is complete to a desired extent, the solvent can be removed if desired or the resulting reactive silane can be crosslinked in situ. When Y contains the isocyanato moiety (e.g., compound of formula (B) is N-(3-triethoxysilyl-propyl)-NCO), the resulting reactive silane typically contains a —N(H)C(O)— moiety (e.g., the compound of formula (A) is N-(3-triethoxysilyl-propyl)-aminocarbonyl).

Preferably, the leaving group Y is $R^X$, H, —O—S(O)$_2$—$(C_1-C_{40})$hydrocarbyl, —O—S(O)$_2$—$(C_1-C_{40})$heterohydrocarbyl. Preferably, the linking group Y is a coupling $(C_1-C_{40})$hydrocarbyl or coupling $(C_1-C_{40})$heterohydrocarbyl, each of which independently is a $(C_1-C_{40})$hydrocarbyl or $(C_1-C_{40})$heterohydrocarbyl, respectively, that contains at least one featured functional group capable of forming the indirect (e.g., via a coupling agent residual) or direct covalent bond to the premodification MSA material. Examples of this featured functional group in Y are electrophilic addition groups, nucleophilic groups, and leaving group-containing moieties. Examples of the electrophilic addition groups in the Y groups are —N=C=O, —O—CN, and epoxy (i.e., oxirane-2-yl). Examples of the nucleophilic groups in the Y groups are —OH and —NH$_2$. Examples of the leaving group-containing moieties in the Y groups are —CH$_2$-LG and —C(O)-LG, wherein LG is the leaving group. Examples of -LG are —N$_2^+$ salt, halo (e.g., as in —CH$_2$-halo or —C(O)-halo), $(C_1-C_{40})$ hydrocarbylO— (e.g., as in —C(O)—O($C_1-C_{40}$)hydrocarbyl), $(C_1-C_{40})$heterohydrocarbylO— (e.g., as in —C(O)—O$(C_1-C_{40})$heterohydrocarbyl), —O—S(O)$_2$—$(C_1-C_{40})$hydrocarbyl, —O—S(O)$_2$—$(C_1-C_{40})$heterohydrocarbyl, $(C_1-C_{40})$hydrocarbyl-C(O)O—, and $(C_1-C_{40})$heterohydrocarbyl-C(O)O—. Examples of the coupling agent are phosgene and phosgene derivatives, wherein the coupling agent residual is a carbonyl (i.e., —C(O)—).

To prepare the MSA bonded to the compound of formula (A) wherein Z is the covalent bond (i.e., Z is absent), allow the premodification MSA material (e.g., an —CH$_2$OH or —CH$_2$NH$_2$ group of the premodification MSA material) to contact under the reaction effective conditions the compound of formula (B) wherein Y is the leaving Y group. To prepare the MSA bonded to the compound of formula (A) wherein Z is the $(C_1-C_{40})$hydrocarbylene or $(C_1-C_{40})$heterohydrocarbylene, allow the premodification MSA material to contact under reaction effective conditions the compound of formula (B) wherein Y is the linking Y group.

When water is used to cure the (shaped) reactive silane-modified MSA material, crosslinks form between pairs of reactive silane functional groups to give the crosslinked silane-modified MSA material. Without being bound by theory, it is believed that a residual of the curing agent (e.g., residual O from H$_2$O molecules) formally displaces the $R^X$ group in each reactive silane functional group of the crosslinking pair thereof and the resulting crosslinking group (a diradical moiety that is not a residual of the premodification MSA material) comprises a silyl-oxy-silyl containing diradical moiety, which covalently bonds two molecules of the MSA material together. This displacement can occur by any suitable mechanism including one wherein separate molecules of water displace $R^X$ groups from each reactive silane functional group of the crosslinking pair thereof generating a pair of silanol groups (Si—OH), which then react together with loss of a molecule of water to form the silyl-oxy-silyl containing diradical moiety. Alternatively, one molecule of water reacts to displace one of the $R^X$ groups from one of the reactive silane functional groups of the crosslinking pair thereof, generating a silanol group (Si—OH), which then reacts by displacing the other $R^X$ group to form the silyl-oxy-silyl containing diradical moiety. Alcohols or carboxylic acids react via mechanisms similar to those for water. Naturally, the crosslinked silane-modified MSA material has a higher $M_n$ than $M_n$ of the precursor uncrosslinked silane-modified MSA material.

In formulas (A) and (B), preferably each of $R^{11}$ and $R^{22}$ independently is $R^X$ or $(C_1-C_{40})$hydrocarbyl, and more preferably $R^X$. Preferably, each $R^X$ independently is halo, $(C_1-C_{40})$hydrocarbyl-O—, or $(C_1-C_{40})$hydrocarbyl-C(O)O—, and more preferably halo or $(C_1-C_{40})$hydrocarbyl-O—. In some embodiments Z is the covalent bond (i.e., Z is absent). In other embodiments in order of increasing preference Z is $(C_1-C_{40})$hydrocarbylene or $(C_1-C_{40})$heterohydrocarbylene; $(C_1-C_{40})$hydrocarbylene; or $(C_1-C_{40})$heterohydrocarbylene. In some embodiments Z is $CH_2CH_2CH_2NHC(O)$—. In some embodiments Y is the leaving group Y, and more preferably any one of the aforementioned embodiments containing the LG. In some embodiments Y is the linking group Y, and more preferably any one of the aforementioned embodiments of the $R^{22}$, linking group. In some embodiments, $R^{11}$, $R^{22}$, and $R^X$ are the same as each other; two of $R^{11}$, $R^{22}$, and $R^X$ are the same as each other and the other one is different; or each of $R^{11}$, $R^{22}$, and $R^X$ are different.

In some embodiments of formula (A) Z is $(C_1-C_6)$alkylene-NHC(O)— and in formula (B) Y is Y is $(C_1-C_6)$alkylene-N═C═O. Preferably, $(C_1-C_6)$alkylene is 1,3-propylene (i.e., —$CH_2CH_2CH_2$—). More preferably, at least one, still more preferably at least two, and even more preferably substantially all of the oxy-silyl containing functional groups that are covalently bonded to molecules of the MSA material are N-(3-triethoxysilyl-propyl)-aminocarbonyl or N-(3-trimethoxysilyl-propyl)-aminocarbonyl (i.e., $(CH_3CH_2O)_3SiCH_2CH_2CH_2NHC(O)$— or $(CH_3O)_3SiCH_2CH_2CH_2NHC(O)$—, respectively).

In some embodiments the manufactured article comprises a shaped reactive silane-modified MSA material that is prepared according to the shaping process.

In addition to the reactive silane-modified MSA materials, the present invention contemplates reactive-(non-silane) functional group-modified MSA materials. The reactive-(non-silane) functional group-modified MSA material comprises at least one reactive-(non-silane) functional group covalently bonded (directly or indirectly) to the MSA material. The reactive-(non-silane) functional group comprises a non-silane reactive portion (lacks a silicon atom) and, preferably, also a non-reactive portion that indirectly links the non-silane reactive portion to the MSA material. The non-reactive portion can comprise a silicon atom, or in other embodiments lacks a silicon atom. Preferably, each reactive-(non-silane) functional group independently is of formula (N): Q-Z—(N), wherein Q is O═C═N—; $H_2C$═C(H)— (i.e., unsubstituted vinyl); $(C_1-C_{10})$alkyl-substituted vinyl; epoxy (i.e., radical of monocyclic moiety of formula $C_2H_3O$); or $(C_3-C_6)$lactonyl (i.e., a radical of monocyclic moiety of formula $C_3H_3O_2$, $C_4H_5O_2$, $C_5H_7O_2$, or $C_6H_9O_2$, respectively); and Z is a covalent bond (i.e., Z is absent), $(C_1-C_{40})$hydrocarbylene, or $(C_1-C_{40})$heterohydrocarbylene. Q is the reactive portion of the reactive-(non-silane) functional group and Z functions as a linker covalently bonding Q directly or indirectly to the MSA material. In some embodiments Z is the covalent bond. In other embodiments Z is the non-reactive portion of the reactive-(non-silane) functional group, i.e., Z is $(C_1-C_{40})$hydrocarbylene, or, preferably, $(C_1-C_{40})$heterohydrocarbylene. Examples of the reactive-(non-silane) functional group are O═C═N—$(C_1-C_{40})$alkylene-N(H)C(O)—; $(O$═$C$═$N)_h$—$(C_2-C_{40})$alkylene-N(H)C(O)—, wherein h is from 2 to 3; vinyl-$(C_1-C_{40})$alkylene-, vinyl-$(C_1-C_{40})$alkylene-C(O)—, or vinyl-$(C_1-C_{40})$alkylene-N(H)C(O)—, wherein the vinyl is unsubstituted (i.e., $H_2C$═C(H)—) or substituted with a $(C_1-C_{10})$alkyl; and epoxy-$(C_1-C_{40})$alkylene. In some embodiments h is an average value of between 2 and 3.

The reactive-(non-silane) functional group-modified MSA materials can be prepared by contacting the premodification MSA material with a suitable polyfunctional reactant under reaction effective conditions. The reaction effective conditions preferably are the same as those described previously for preparing the reactive silane-modified MSA material. The polyfunctional reactant can be readily determined. For example, the polyfunctional reactant can be, for example, a bifunctional reactant comprising epichlorohydrin or a $(C_1-C_{10})$alkyl-substituted epichlorohydrin; a bisisocyanate having at least two, —N═C═O functional groups spaced apart by a linker, and preferably an average of more than two isocyanate groups (e.g., as in PAPI™ 27 and PAPI™ 94, which are polymethylene polyphenylisocyanates having an average of 2.7 and 2.3 isocyanato functionalities per mole, respectively; available from The Dow Chemical Company); a bifunctional reactant comprising a second-reacting vinyl group (i.e., $H_2C$═C(H)—) or a $(C_1-C_{10})$alkyl-substituted vinyl group (e.g., $CH_2$═C(($C_1-C_{10})$alkyl)- such as $H_2C$═C(CH_3)— or $CH_2$═C(CH_3)C(O)—) and a first reacting halocarbonyl (—C(O)-halo) or isocyanato (—N═C═O), wherein the second- and first-reacting groups are directly bonded to each other or indirectly bonded via (spaced apart by) the linker; an epoxy group ($C_2H_4O$); and a lactonyl (e.g., ε-caprolactonyl). Examples of corresponding reactive-(non-silane) functional group-modified MSA materials prepared therefrom are an oligomer or polymer of formula epoxy-$CH_2$—O-MSA material; an oligomer or polymer of formula O═C═N-linker-N(H)C(O)—O-MSA material; an oligomer or polymer of formula $H_2C$═C(H)—C(O)—O-MSA material; an oligomer or polymer of formula $H_2C$═C(H)—C(O)—$(C_1-C_{40})$hydrocarbylene-N(H)C(O)—O-MSA material; and $H_2C$═C(CH_3)—C(O)—$(C_1-C_{40})$hydrocarbylene-N(H)C(O)—O-MSA material, wherein the oxygen of —O-MSA is formally derived from the hydroxyl group of the hydroxyl-containing premodification MSA material. Preferably, the second-reacting functional groups and ad rem reactive portions are different than functional groups of the premodification MSA material.

Progress of the reaction between the active hydrogen-containing functional groups and the polyfunctional reactant can be followed by, for example, infrared spectroscopy.

The present invention also provides a curing process comprising contacting the reactive-(non-silane) functional group-modified MSA material with a crosslinking effective amount of a promoter so as to prepare a crosslinked non-silane functional group modified MSA material. Such a curing process is especially useful when the reactive portion of the reactive-(non-silane) functional group is a vinyl, substituted vinyl, or isocyanato group. For example, when the reactive portion of the reactive-(non-silane) functional group is an isocyanato, the promoter can be a polyamine, polyol, or water. Examples of suitable polyamines are aliphatic amines, cycloaliphatic amines, amidoamines, and polyamides. Preferred are the aliphatic amines, more preferred are aliphatic amines containing primary amine (—$NH_2$) hydrogen atoms. Examples of the aliphatic amines containing —$NH_2$ are diethylene triamine, triethylenetetraamine, and tetraethylenepentamine. Examples of suitable polyols are glycols (e.g., ethylene glycol), glycerin, and a sachamide.

When curing process employs the reactive portion of the reactive-(non-silane) functional group is the vinyl or substituted vinyl group, the promoter can comprise electromagnetic radiation such as electron beam (EB) radiation or ultraviolet light with a curing agent that is a photoinitiator or the promoter can comprise a thermally-activated curing agent system. Examples of useful photoinitiators are 1-hydroxycyclohexyl phenyl ketone, benzil, benzophenone, dimethyl ketal, and 2-hydroxy-2-methyl-1-phenyl-1-propanone. The thermally-activated curing agent systems and methods comprise contacting a vinyl- or substituted vinyl type reactive-(non-silane) functional group-modified MSA material with a thermally-activatable curing agent in such a way as to form an uncured polymer blend thereof; and applying heat to the uncured polymer blend to give a crosslinked non-silane functional group modified MSA material. Examples of thermally-activatable curing agents are organic peroxides and alpha-type azonitriles. Examples of the organic peroxides are methylethylketone peroxide, cumene hydroperoxide, tertiary-butyl perbenzoate, and 1,1-di(tertiary-butylperoxy)-3,3,5-trimethylcyclohexane. An example of the alpha-type azonitrile is α,α'-azobis(isobutyronitrile) (i.e., $(CH_3)_2C(CN)$—N=N—$C(CN)(CH_3)_2$). The uncured polymer blend typically comprises a surface and in some embodiments the curing process further comprises preventing oxygen gas from contacting the surface thereof during the curing process. The preventing can be desirable for preventing aerobic type curing from competing with anaerobic type curing, where anaerobic type curing alone results in a cured polymer blend comprising the crosslinked non-silane functional group modified MSA material, wherein the cured polymer blend is uniformly cured throughout. The preventing can be done by any suitable means such as, for example, curing the uncured polymer blend further comprising the thermally-activatable curing agent under an inert gas atmosphere (e.g., a gas of nitrogen, argon, helium, or a mixture thereof) or coating the surface thereof with an optionally removable barrier material such as, for example, a metal foil or an oxygen scavenger film. Naturally, the particular type of coating could be chosen to be compatible with the particular curing method employed. If desired such removable barrier material can be removed after the curing step is complete. When the vinyl- or substituted vinyl group comprises an acrylate ($CH_2$=C(H)C(O)O—) or substituted acrylate ($CH_2$=C($R^D$)C(O)O—, wherein each $R^D$ independently is a hydrogen atom or ($C_1$-$C_{10}$)alkyl), the curing can alternatively comprise Michael Addition polymerization. The Michael Addition polymerization comprises contacting the acrylate or substituted acrylate type reactive-(non-silane) functional group-modified MSA material, as the case may be, in the uncured polymer blend with the polyamine. In some embodiments the acrylate or substituted acrylate curing process employs a curing agent comprising a catalyst useful for polymerizing an acrylic acid ester, such as Ziegler-type catalysts (e.g., tetrabutyltitanium).

Typically the curing agent is widely dispersed in the reactive functional group-modified MSA material. A combination of at least two promoters (e.g., UV radiation and 1-hydroxycyclohexyl phenyl ketone) may be used. In some embodiments the curing process employs a curing-in-place method of curing. In some embodiments the crosslinking effective amount preferably is from 0.1 wt % to 10 wt %, more preferably from 0.5 wt % to 7 wt %, and still more preferably 1 wt % to 5 wt % of the total weight of the material being crosslinked and the promoter.

The present invention also provides a composition comprising the crosslinked non-silane functional group-modified MSA material and a manufactured article comprising an effective amount (for a particular application) of the crosslinked non-silane functional group modified MSA material.

Alternatively, the reactive-(non-silane) functional group-modified MSA material can be derivatized by reacting it with the derivatizing agent that is the derivatizing monomer, polymer or molecule. The derivatizing monomer can be a higher functional or molecular weight monomer than a monomer used to prepare the premodification MSA material or a different monomer (e.g., a monomer for preparing a non-MSA (co)polymer). Examples of the different monomer are ethylene, a ($C_3$-$C_{40}$)alpha-olefin, and an olefin used to prepare the non-MSA derivatizing (co)polymers described below. The derivatizing polymer can be another premodification MSA material or a non-MSA polymer. Examples of the non-MSA polymer are the poly(ether block amide) known under trade name of PEBAX (Arkema, Colombes, France), poly(ethylene glycol), and poly(vinyl alcohol). The derivatizing molecule can be, for example, a reagent enabling titration or spectroscopic characterization of the resulting derivatized product.

The derivatized MSA product is structurally different than the reactive functional group-modified MSA material from which it is prepared and both of the foregoing are different than the corresponding premodification MSA material. In some embodiments the derivatized functional group of the derivatized MSA product lacks at least one, in other embodiments lacks at least two, and in still other embodiments lacks at least three, and in yet other embodiments lacks every one of the following moieties: —OH, —N(H)—, —$NH_2$, C=C, C≡C, epoxy, chloro, bromo, iodo, and C=O.

The terms "molecularly self-assembling material" and "MSA material" and "premodification MSA material" are synonymous and generally mean an oligomer or polymer as described in paragraphs [0062] to [0065] of US 2010/0126341 A1.

Before reacting with the polyfunctional reactant, the premodification MSA material preferably is characterized by a $M_n$ of the polymer or oligomer that is between 1000 grams per mole (g/mol) and 50,000 g/mol. Preferably, determine the $M_n$ by nuclear magnetic resonance (NMR) spectroscopy as described later. The premodification MSA material in some embodiments in order of increasing preference has $M_n$ of at least 2000 g/mol; at least about 3000 g/mol, or at least about 4000 g/mol. The premodification MSA material in some embodiments in order of increasing preference has $M_n$ of 30,000 g/mol or less; 20,000 g/mol or less; 12,000 g/mol or less; 9,000 g/mol or less; or less than 6,000 g/mol. In some embodiments the premodification MSA material has $M_n$ of from >2000 g/mol to 12,000 g/mol, from >2000 g/mol to 5,000 g/mol, from >4000 g/mol to 8000 g/mol or from >4500 g/mol to 5500 g/mol.

In some embodiments the premodification MSA material is an oligomer or polymer comprising repeat units of Formula I and at least one second repeat unit of Formula V. Preferably in such embodiments at least one, in some embodiments both, of $R^1$ and Rb independently are at each occurrence the aromatic ($C_6$-$C_{20}$)hydrocarbylene group or the phenylene-[het]-phenylene. In some of such embodiments the premodification MSA material lacks repeat units of Formula IV. In some embodiments the present invention provides a composition of matter comprising the aromatic group-containing premodification MSA material of this paragraph.

In some embodiments the premodification MSA material is an oligomer or polymer comprising repeat units of Formula I and at least one second repeat unit that is the ester-urethane repeat unit of Formula IV or, more preferably, at least one second repeat unit selected from the group consisting of the ester-amide repeat units of Formula II and III; and wherein $R^1$ at each occurrence independently is a bond or a non-aromatic ($C_1$-$C_{20}$)hydrocarbylene group; and w represents the ester mol fraction of Formula I, and x, y and z represent the amide or urethane mole fractions of Formulas II, III, and IV, respectively, where w+x+y+z=1, and 0<w<1, and at least one of x, y and z is >zero but <1. In some of such embodiments the premodification MSA material lacks repeat units of Formula IV. In some embodiments the premodification MSA material is an oligomer or polymer comprising repeat units of Formula I and at least one second repeat unit selected from the group consisting of the ester-amide units of Formula II and III; wherein $R^1$ at each occurrence independently is a bond or a non-aromatic ($C_1$-$C_{20}$)hydrocarbylene group; and n is at least 1 and has a mean value <2; and w represents the ester mol fraction of Formula I, and x and y represent the amide mole fractions of Formulas II and III, respectively, where w+x+y=1, and 0<w<1, and at least one of x and y is >zero but <1.

In some embodiments the premodification MSA material is the polymer or oligomer of the formula:

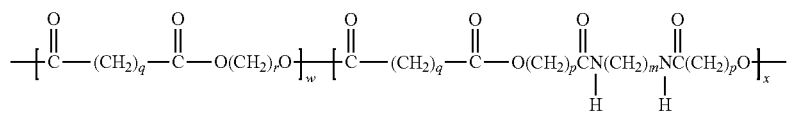

wherein p and r independently are 2, 3, 4, 5, 6 or 8; q independently is an integer of from 0 to 10; m is from 2 to 6; and the $M_n$ of the polymer or oligomer, before covalent bonding to the halo-silyl or oxy-silyl containing functional group, is between about 1000 g/mol and 30,000 g/mol. Preferably, p, q, and r are independently 2, 3, 4, 5, 6 or 8, and more preferably p, q, and r are independently 2, 3, 4, 5, 6 or 8; and m is 2.

In some embodiments the premodification MSA material is the polymer or oligomer of any one of the formulas:

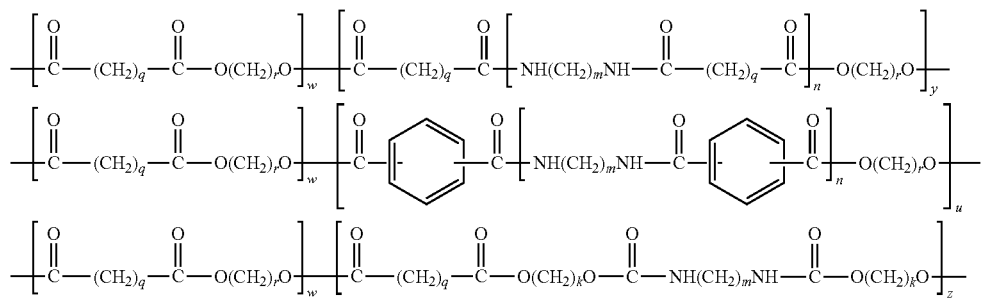

wherein q is independently from 0 to 10, and r is independently 2, 3, 4, 5, 6 or 8; m is from 2 to 6; n is at least 1 and has a mean value <3, k is independently 2, 3 or 4, and the $M_n$ of the polymer or oligomer, before covalent bonding to the halo-silyl or oxy-silyl containing functional group, is between about 1000 g/mol and 30,000 g/mol. In some embodiments the polymer or oligomer is of the first formula (containing y), second (containing u) formula, or third formula (containing z). Preferably q is 4. Preferably r is 2 or 4. Preferably m is 2 or 6. Preferably n is 1 or has a mean value between 1 and 2. Preferably k is 2.

Preferably, the premodification MSA has at least one, preferably at least two —$NH_2$ (e.g., as in —$CH_2NH_2$) or —OH (e.g., as in are —$CO_2H$ or, preferably, —$CH_2OH$) groups; more preferably at least one, still more preferably at least two —OH groups, and even more preferably at least two —OH groups that are end groups and that react with the polyfunctional reactant to give the reactive functional group thereon.

The premodification MSA materials described above and the monomers used to prepare the premodification MSA materials can be prepared by any suitable method. Examples of suitable methods are described in U.S. Pat. No. 6,172,167 B1; US 2008/0214743 A1; US 2009/0093971 A1; US 2010/0041857 A1; US 2010/0093971 A1; or WO 2009/134824 A2. For illustration, urethane containing monomer(s), and more preferably amide containing monomer(s), including oligomers can be subsequently reacted with appropriate monomers under effective step-growth polymerization or polycondensation conditions to prepare the MSA as a MSA polyesterurethane or, more preferably MSA polyesteramide. As used herein the term "polyesterurethane" means an oligomer or polymer having C(O)OC and OC(O)N moieties in its backbone and repeat units comprising Formula I and at least Formula IV. The term "polyesteramide" means an oligomer or polymer having C(O)OC and CC(O)N moieties in its backbone and repeat units comprising Formula I and at least one of Formulas II, III, and V (e.g., II or III). Processes for preparing such MSA polyesteramides and polyesterurethanes typically are based on (a) ester interchange/transesterification involving monomers for MSA material that comprise a diester and either a polyol (preferably diol) or hydroxy-ester; (b) esterification typically involving such monomers that comprise a diacid and either the polyol (preferably diol) or a hydroxyacids; (c) esterification by acid anhydride and polyol (preferably diol) or esterification involving an acid halide and the polyol (preferably diol); or (d) reaction of monomers that comprise a diamine with a polyester. Various mole ratios of reactants can be used in preparing the MSA polyesteramide or polyesterurethane. For example, at the start of the preparation of the MSA polyesteramide or polyesterurethane, a reactor preferably contains a mole ratio of diol monomer to diacid or diester monomer of from about 10:1 to about 1:2, and preferably from 2:1 to 1:1.5. When the diesters, diacids, acid anhydrides, diols, hydroxy-esters, or hydroxyacids are utilized, a linear oligomer or polymer results. Alternatively, in addition to the monomers for MSA material that comprise diesters, diacids, acid anhydrides, diols, hydroxy-esters, or hydroxy-acids, relatively smaller amounts of higher numbered functional monomers such as triols or triacids can be added to the esterifications, leading to a branched MSA polyesteramide or polyesterurethane.

Preferred effective step-growth polymerization or polycondensation conditions comprise a reaction time of from 0.1 hour to 24 hours; reaction temperature of from about 125° C. to about 300° C.; reaction mixture that is a solution comprising a solvent or, more preferably, a melt (solvent free); devolatilization of volatile components (e.g., diol released from transesterification, excess (unreacted) diol, water, and monoalcohol by-product); and optionally with an inert gas stream, reduced pressure in the reactor, the reaction mixture further comprising a catalytically effective amount (preferably a sub-stoichiometric amount) of a catalyst or mixture of catalysts that promote the formation of ester linkages or ester interchange/transesterification. Examples of such catalysts are metal acetates such as calcium acetate, manganese acetate, antimony acetate, zinc acetate, and tin acetate; tin octanoate; metal oxides such as antimony oxide, germanium oxide, and dibutyltin oxide; dibutyltin dilaurate; and titanium alkoxides (also known as titanates) such as titanium butoxide, titanium isopropoxide, titanium propoxide, and titanium ethylhexyloxide. As excess diol in the transesterification process is removed, $M_n$ of the forming MSA polyesteramide or polyesterurethane increases. The reaction can be monitored by, for example, proton-NMR, and polymerization can be stopped at a desired $M_n$ value.

Any reaction described herein in some embodiments further comprises removing any by-products therefrom. Examples of the removing are phase separating, filtration, evaporation, including evaporation with heating and under reduced pressure. The invention contemplates using lower pressures (e.g., down to 0.01 kPa) if desired to drive equilibrium reactions to completion by removing any volatile by-products, solvents, reactants, and the like.

The present invention also provides a blend comprising any one of the aforementioned invention compositions, or a preferred embodiment thereof; and a non-MSA polymer. Examples of the non-MSA polymer are the poly(ether block amide) known under trade name of PEBAX (Arkema, Colombes, France), poly(ethylene glycol), and poly(vinyl alcohol). Preferably, the invention compositions and blend lack a product of a reaction between the premodified MSA material and the non-MSA polymer, especially a product of a transesterification reaction, Michael Addition reaction, or a combination thereof.

The term "$(C_1-C_{40})$hydrocarbylene" means a hydrocarbon diradical of from 1 to 40 carbon atoms wherein each hydrocarbon diradical independently is aromatic (i.e., $(C_6-C_{40})$ arylene, e.g., phenylene) or non-aromatic (i.e., $(C_1-C_{40})$aliphatic diradical); saturated (i.e., $(C_1-C_{40})$alkylene or $(C_3-C_{40})$cycloalkylene) or unsaturated (i.e., $(C_2-C_{40})$alkenylene, $(C_2-C_{40})$alkynylene, or $(C_3-C_{40})$cycloalkenylene); straight chain (i.e., normal-$(C_1-C_{40})$alkylene) or branched chain (e.g., secondary-, iso-, or tertiary-$(C_3-C_{40})$alkylene); cyclic (at least 3 carbon atoms, (i.e., $(C_6-C_{40})$arylene, $(C_3-C_{40})$cycloalkenylene, or $(C_3-C_{40})$cycloalkylene, including mono- and poly-cyclic, fused and non-fused polycyclic, including bicyclic; or acyclic (i.e., $(C_1-C_{40})$alkylene, $(C_2-C_{40})$alkenylene, or $(C_2-C_{40})$alkynylene); or a combination of at least two thereof (e.g., $(C_3-C_{20})$cycloalkylene-$(C_1-C_{20})$alkyl or $(C_6-C_{20})$arylene-$(C_1-C_{20})$alkyl). The radicals of the hydrocarbon diradical can be on same or, preferably, different carbon atoms. Other hydrocarbylene groups (e.g., $(C_1-C_{10})$hydrocarbylene and $(C_2-C_{20})$hydrocarbylene)) are defined in an analogous manner. Preferably, a $(C_1-C_{40})$hydrocarbylene independently is an unsubstituted or substituted $(C_1-C_{40})$ alkylene, $(C_3-C_{40})$cycloalkylene, $(C_3-C_{10})$cycloalkylene-$(C_1-C_{10})$alkyl, $(C_6-C_{40})$arylene, or $(C_6-C_{10})$ arylene-$(C_1-C_{10})$alkyl. In some embodiments the $(C_1-C_{40})$ hydrocarbylene is a $(C_1-C_{40})$alkylene, more preferably $(C_1-C_{20})$alkylene, and still more preferably $(C_1-C_{10})$alkylene.

The term "$(C_1-C_{40})$hydrocarbyl" is as defined previously for $(C_1-C_{40})$hydrocarbylene except the $(C_1-C_{40})$hydrocarbyl is a monoradical. Preferably, a $(C_1-C_{40})$hydrocarbyl independently is an unsubstituted or substituted $(C_1-C_{40})$alkyl, $(C_3-C_{40})$cycloalkyl, $(C_3-C_{10})$cycloalkyl-$(C_1-C_{10})$alkyl, $(C_6-C_{40})$ aryl, or $(C_6-C_{10})$aryl-$(C_1-C_{10})$alkyl. In some embodiments the $(C_1-C_{40})$hydrocarbyl is a $(C_1-C_{40})$alkyl, more preferably $(C_1-C_{20})$alkyl, and still more preferably $(C_1-C_{10})$alkyl.

The term "$(C_1-C_{40})$heterohydrocarbylene" means a heterohydrocarbon diradical of from 1 to 40 carbon atoms and from 1 to 6 heteroatoms; wherein each heterohydrocarbon diradical independently is aromatic (i.e., $(C_1-C_{40})$heteroarylene, e.g., tetrazol-2,5-diyl, 1,3,4-oxadiazol-2,5-diyl, imidazol-1,3-diyl, pyrrol-1,3-diyl, pyridine-2,6-diyl, and indol-1,5-diyl) or non-aromatic (i.e., $(C_1-C_{40})$heteroaliphatic diradical); saturated (i.e., $(C_1-C_{40})$heteroalkylene or $(C_2-C_{40})$ heterocycloalkylene) or unsaturated (i.e., $(C_2-C_{40})$heteroalkenylene, $(C_2-C_{40})$heteroalkynylene, or $(C_2-C_{40})$heterocycloalkenylene); straight chain (i.e., normal-$(C_1-C_{40})$ heteroalkylene) or branched chain (i.e., secondary-, iso-, or tertiary-$(C_3-C_{40})$heteroalkylene); cyclic (at least 3 ring atoms, (i.e., $(C_1-C_{40})$heteroarylene, $(C_2-C_{40})$heterocycloalkenylene, or $(C_2-C_{40})$heterocycloalkylene, including mono- and poly-cyclic, fused and non-fused polycyclic, including bicyclic); or acyclic (i.e., $(C_1-C_{40})$heteroalkylene, $(C_2-C_{40})$ heteroalkenylene, or $(C_2-C_{40})$heteroalkynylene); or a combination of at least two thereof (e.g., $(C_3-C_{20})$cycloalkylene-$(C_1-C_{20})$heteroalkyl or $(C_1-C_{20})$heteroarylene-$(C_1-C_{20})$ alkyl). The radicals of the heterohydrocarbon diradical can be on same or, preferably, different atoms, each radical-bearing atom independently being carbon (e.g., —$CH_2CH_2CH_2OCH_2$—), oxygen (e.g., —$CH_2CH_2CH_2$—O—), nitrogen (e.g., —$CH_2CH_2$—N($R^N$)—), or sulfur (e.g., —$CH_2CH_2$—S—, —$CH_2CH_2CH_2$—S(O)—, or —$CH_2CH_2$—S(O)$_2$—). Other heterohydrocarbylene groups (e.g., $(C_2-C_{20})$heterohydrocarbylene)) are defined in an analogous manner.

The term "$(C_1-C_{40})$heterohydrocarbyl," if present, is as defined previously for $(C_1-C_{40})$heterohydrocarbylene except the $(C_1-C_{40})$heterohydrocarbyl is a monoradical.

Unless otherwise indicated, each hydrocarbon radical and diradical and heterohydrocarbylene radical and diradical independently is unsubstituted or, in other embodiments, at least one is substituted by at least 1, preferably 1 to 6, substituents, $R^S$. In some embodiments each $R^S$ independently is selected from the group consisting of a halogen atom (halo); any one of polyfluoro and perfluoro substitution; unsubstituted $(C_1-C_{18})$alkyl; $F_3C$—; $FCH_2O$—; $F_2HCO$—; $F_3CO$—; $R^V_3Si$—; $R^GO$—; $R^GS$—; $R^GS(O)$—; $R^GS(O)_2$—; $R^G_2P$—; $R^G_2N$—; $R^G_2C$=N—; NC—; oxo (i.e., =O); $R^GC(O)O$—; $R^GOC(O)$—; $R^GC(O)N(R^G)$—; and $R^G_2NC(O)$—, wherein each $R^G$ independently is a hydrogen atom or an unsubstituted $(C_1-C_{18})$alkyl and each $R^V$ independently is a hydrogen atom, an unsubstituted $(C_1-C_{18})$alkyl, or an unsubstituted $(C_1-C_{18})$alkoxy. The term "halo" means fluoro, chloro, bromo, or iodo; or in an increasingly preferred embodiment chloro, bromo or iodo; chloro or bromo; or chloro. The term "heteroatom" means O, S, S(O), S(O)$_2$, or N($R^N$); wherein each $R^N$ independently is unsubstituted $(C_1-C_{18})$hydrocarbyl or $R^N$ absent (when N comprises —N=).

Certain unsubstituted chemical groups or molecules are described herein as having a practical upper limit of 40 carbon atoms (e.g., $(C_1-C_{40})$hydrocarbylene), but the present invention contemplates such unsubstituted chemical groups or molecules having a maximum number of carbon atoms that is lower or higher than 40 (e.g., 10, 20, 60, 100, 1,000, or >1,000). In some embodiments, each unsubstituted chemical group and each substituted chemical group has a maximum of 25, 15, 12, 6, or 4 carbon atoms.

The shaping process can form the three-dimensional configuration by any suitable shaping process in any suitable configuration. In some embodiments of the shaping process, the separating out is evaporating, blotting, wiping, and phase separating, centrifuging, or a combination thereof. Preferably, the optional liquid plasticizer (e.g., chloroform or acetonitrile), when employed, comprises <50 wt % of the melt. Shaped solutions typically employ a support until enough of the solvent can be removed therefrom so as to form a self-supporting shaped manufactured article. An example of a shaped solution is a cast film (on a support). Preferably, the solvent comprises from 50 wt % to 99 wt % of the solution. The solvent and liquid plasticizer can be the same or different. The manufactured article can comprise residual amounts (typically <5 wt %) of the liquid plasticizer or solvent. In some embodiments the process shapes the reactive functional group-modified MSA material (e.g., reactive silane-modified MSA material) and prepares a shaped reactive functional group-modified MSA material (e.g., shaped reactive silane-modified MSA material).

Examples of suitable shaping processes are calendaring, coating, casting, extruding, flaking, flattening, granulating, grinding, inflating, molding, pelletizing, pressing, rolling, and spraying. Examples of useful three-dimensional configurations are bowls, coatings, cylinders, die casts, extruded shapes, films (having a length, width, and thickness), flakes, granules, molded shapes, pellets, powders, sheets (having a length, width, and thickness, which is greater than the thickness of the film), and trays. Examples of the sheets are flat sheets and pleated sheets. In some embodiments the invention material is a semipermeable material. Preferably, the semipermeable material is a particulate packing material (e.g., for use in a gas filter cartridge); plaque; film; rolled sheet (e.g., a hollow cylinder); container; or a membrane. In some embodiments the semipermeable material comprises a semipermeable membrane having spaced-apart entrance and exit faces, wherein the semipermeable membrane contains an acid gas separating effective amount of the reactive functional group-modified MSA material, wherein the semipermeable membrane is capable of functioning in such a way so as to separate at least some acid gas from a separable gas mixture comprising the acid gas and at least one permeation-resistant gas.

Preferred is the semipermeable membrane, which includes symmetric and asymmetric semipermeable membranes. Symmetric semipermeable membranes are characterized by transport properties that are the same across the entire membrane. Asymmetric semipermeable membranes are characterized by same transport properties across the entire semipermeable membrane are not the same (e.g., as in a gradient of transport properties). Each semipermeable membrane independently has spaced-apart entrance and exit faces. Preferably, the semipermeable membrane is characterizable as having a thickness (average thickness) between its entrance and exit faces of from 50 nanometers (nm) to 10,000,000 nm (10 millimeters (mm)), preferably from 100 nm to 5,000,000 nm, and more preferably from 1,000 nm (1 micron ($\mu$m)) to 500,000 nm (500 $\mu$m). The semipermeable membrane can be supported on a (semi)permeable support if necessary (e.g., for a 50 nm to 500 nm thick semipermeable membrane, which may or may not be adequately self-supporting). The semipermeable membrane has a three-dimensional shape referred to herein as a membrane module. Preferably, the membrane module comprises a flat sheet, plaque or film; contoured sheet, plaque or film (e.g., undulating sheet); or tubular structure (e.g., hollow fiber). In some embodiments the membrane module further comprises a permeable or semipermeable membrane support in supporting operative contact with the semipermeable membrane.

In some embodiments the present invention provides a separation method of using the semipermeable membrane comprising the acid gas separating effective amount of the reactive functional group-modified MSA material (e.g., reactive silane-modified MSA material) to separate an acid gas from a separable gas mixture comprising the acid gas and non-acid gas, the method comprising contacting the entrance face (upstream face) of the semipermeable membrane with the separable gas mixture; allowing a first permeant gas portion of the separable gas mixture to pass through the semipermeable membrane and preventing a permeation resistant gas portion of the separable gas mixture from passing therethrough; and removing a first permeant gas from the exit face (downstream face) of the semipermeable membrane, wherein the first permeant gas comprises at least some of the acid gas from the separable gas mixture, the first permeant gas thereby being enriched in the acid gas compared to the separable gas mixture (and compared to the permeation resistant gas). As used herein the term "acid gas" means a substance that can be characterized as being vaporous or gaseous at 30 degrees Celsius (° C.) and that can be characterized as being capable of functioning as a Lewis acid (e.g., $CO_2$ gas) or Brønsted acid (e.g., $H_2S$ gas) or, preferably, if dissolved in pure water to a concentration of 1 wt %, would form an aqueous mixture having a potential of hydrogen (pH) of <pH 7.0, or a combination thereof. The term "acid gas separating effective amount" means a quantity sufficient to enable physical distancing or removing of the vaporous or gaseous substance (from a remainder of the separable gas mixture). The terms "entrance face" and "exit face" respectively mean a surface through which a substance (e.g., at least some of the acid gas) enters and a surface from which some portion of the entered substance (e.g., some portion of the at least some of the acid gas) leaves. The surfaces independently are smooth or textured, flat or contoured (e.g., curved, cylindrical, or undulated). The faces can be planar or nonplanar. Planes of substantially planar faces can be non-parallel to and angularly off-set from each other or, preferably, parallel to and opposite from each other. The separation method separates at least some of at least one acid gas from the separable gas mixture.

The semipermeable material (e.g., semipermeable membrane) can function in the separation method as an acid gas selective absorbent or, preferably, a non-acid gas selective barrier (i.e., a device that allows acid gas to penetrate into and, preferably, through and out of the semipermeable material, while inhibiting, slowing, preventing, or blocking penetration or penetration and passing through and out thereof by a non-acid gas.). The separation method does not require the semipermeable material to function as a sieve (e.g., the separation method is effective when the acid gas and permeation resistant gas are approximately the same size as each other).

In the separation method, at least some of the acid gas component of the permeant gas permeates into and preferably passes through and out of the non-acid gas selective barrier (semipermeable material, e.g., semipermeable membrane) at a higher permeability than a permeability of the permeation-resistant gas. A result is that, compared to the separable gas mixture, at least some of the acid gas component of the permeant gas permeates into the semipermeable material, as the case may be, so as to give a permeant gas-containing semipermeable material. Alternatively and preferably, at least some of the acid gas component permeates into and passes through and out of the semipermeable material (i.e., semipermeable membrane) so as to give a downstream permeant gas composition that has been enriched in (i.e., has a higher percentage of) the acid gas (e.g., enriched in $CO_2$ gas). It is likely that the downstream permeant gas composition contains permeation resistant gas(es), but in lower concentration(s) than their concentration(s) in the separable gas mixture. The remainder portion of the separable gas mixture comprises an upstream remnant that includes unseparated acid gas, if any, and an enriched portion of the at least one permeation-resistant gas. The remainder of the separable gas mixture has not permeated into or permeated into and passed through and out the semipermeable material (naturally having been prevented from doing so by the semipermeable material), and has been enriched in the at least one permeation-resistant gas compared to the separable gas mixture.

The temperature of the separable gas mixture and semipermeable membrane, as the case may be, during the separation method (i.e., the separation temperature) can be above ambient temperature such as in natural gas or flue gas sweetening applications, at ambient temperature, or below ambient temperature such as in some natural gas sweetening applications. Preferably, the reactive functional group-modified MSA material, or the crosslinked product thereof, of its ad rem semipermeable material (e.g., semipermeable membrane) and separable gas mixture in contact therewith independently are maintained at a separation temperature of from −50° C. to 300° C. More preferably the separation temperature is from −30° C. to 100° C., still more preferably from −10° C. to 90° C., and even more preferably from 10° C. to 70° C. (e.g., 20° C. to 60° C.). Although, a temperature of from about 250° C. to 280° C. is preferred for separation of $CO_2$ gas from $H_2$ gas with the cured polymer blend. Pressure of the separable gas mixture at the entrance face of the semipermeable membrane (entrance face pressure) can be any pressure suitable for allowing the separation method and is typically >90 kPa (e.g., 10,000 kPa or less).

The semipermeable membrane can be employed for acid gas separations in any suitable manner such as interposed in a feed stream of the separable gas mixture from a combustion furnace or natural gas well-head or as a house wrap or other barrier material. In some embodiments the membrane module is adapted for use in a unit operation wherein acid gas is separated from the separable gas mixture. The membrane module can be employed as a component of a separation device adapted for receiving a flow of flue gas from the combustion apparatus or natural gas from the well-head and separating at least some of the acid gas therefrom. Portions of the separation device other than the membrane module (e.g., support members and gas conduits) can comprise any material. Preferably, the portions of the separation device that can contact the flue or natural gas are resistant to decomposition by the acid gas. Examples of suitable acid gas-resistant materials are stainless steels, polyolefins (e.g., polypropylene and poly(tetrafluoroethylene)) and a HASTELLOY™ metal alloy (Haynes Stellite Corp., Kokomo, Ind., USA).

In some embodiments the separable gas mixture is a flue gas or natural gas. Examples of a flue gas are combustion gases produced by burning coal, oil, natural gas, wood, hydrogen gas, or a combination thereof. The natural gas can be naturally-occurring (i.e., found in nature) or manufactured. Examples of a manufactured methane gas-containing gas mixture are methane produced as a by-product from a crude oil cracking operation and biogas, which can be produced in landfills or sewage facilities from catabolism of garbage and biological waste by microorganisms. In some embodiments the unit operation is employed downstream from a furnace or other combustion apparatus for separating acid gas from flue gas or downstream from an oil or natural gas well-head for separating acid gas from natural gas.

In the separation method, preferably, the acid gas comprises a carbon oxide gas, carbon sulfide gas, carbon oxide sulfide gas, nitrogen oxide gas, sulfur oxide gas, hydrogen sulfide gas ($H_2S$ (g)), or a hydrogen halide gas (or vapor). In some embodiments the acid gas comprises the carbon oxide gas. Preferably, the carbon oxide gas comprises carbon monoxide (CO) gas and, more preferably, carbon dioxide ($CO_2$) gas.

Examples of preferred non-acid gases (i.e., permeation-resistant gases) are gases of hydrogen ($H_2$), methane ($CH_4$), ethane ($CH_3CH_3$), propane ($CH_3CH_2CH_3$), butane ($CH_3CH_2CH_2CH_3$), hydrogen ($H_2$), nitrogen ($N_2$), oxygen ($O_2$), a noble element, a non-acidic component of air (e.g., $N_2$ gas, $O_2$ gas, and noble gas), and a non-acidic component of flue or natural gas (e.g., $N_2$ gas or $O_2$ gas). Preferably, the noble element gas is helium (He) gas, argon (Ar) gas, or a mixture thereof.

Preferably, the separable gas mixture comprises a flue gas or natural gas.

Gas separation performance of the semipermeable material can be characterized in any suitable manner. Examples of such suitable manner are gas permeability, gas selectivity, gas permeance, and gas flux. Gas permeability is a chemical/physical property of a given semipermeable material-gas pairing that is gas flux normalized by film thickness and gas pressure differential across the semipermeable material at a given temperature. The term "gas flux" means rate of flow of a gaseous fluid through a surface. The flow rate can be reported in any suitable unit but preferably is reported as ($cm^3$ gas)/($cm^2$*s). Gas permeability can be described in terms of a pure gas permeability, which is expressed in units of barrer. One barrer equals $10^{-10}$ ($cm^3$ gas)*cm/($cm^2$*s*cmHg). Pure gas permeabilities are determined as described later.

In some embodiments the separation is characterized by a gas permeance. Permeance of a gas is determined by normalizing gas flux for partial pressure of the gas across the semipermeable membrane, where gas permeance decreases with increasing thickness of the semipermeable membrane. Gas permeance is expressed in gas permeation units (GPU), where 1 GPU is defined as $10^{-6}$ ($cm^3$ gas)/($cm^2$*s*cmHg). Pure or mixed gas fluxes can be used. While in some embodiments gas permeance is calculated using the gas fluxes measured with the aforementioned 200 μm thick semipermeable membrane, semipermeable membranes of interest in industrial settings are typically substantially thinner (e.g., from 0.05 μm to 5 μm thick) and so more preferred GPU values will be much higher for industrial-type semipermeable membranes. Accordingly in some embodiments the semipermeable membrane (e.g., from 50 μm to 500 μm thick) and separation method independently are characterizable as having or exhibiting a pure $CO_2$ gas permeance of >0.1 GPU, more preferably >0.15 GPU, still more preferably >0.25 GPU, even more preferably >0.35 GPU, yet more preferably >0.4 GPU. In other embodiments, the semipermeable membrane (e.g., from 0.05 μm to 5 μm thick) and separation method independently are characterizable as having or exhibiting a pure $CO_2$ gas permeance of >100 GPU, more preferably >500 GPU, still more preferably >1000 GPU, and even more preferably >2000 GPU; and in other industrial embodiments <8000 GPU.

In some embodiments the separation is characterized by gas permeability. In some embodiments the semipermeable membrane and separation method independently are characterizable as having or exhibiting a pure $CO_2$ gas permeability in some embodiments in order of increasing preference of >10 barrer; >20 barrer; >30 barrer; >50 barrer; or >70 barrer, wherein the pure $CO_2$ gas permeabilities are determined with 200 microns (μm) thick semipermeable membrane, at 35° C. and a gas feed pressure of 15 psig (103 kPa). While preferably the pure $CO_2$ gas permeability under these conditions is higher, in some embodiments the pure $CO_2$ gas permeability is in some embodiments <500 barrer; <250 barrer; or <100 barrer. While it might be desirable to have higher pure $N_2$ gas permeability under these conditions, in some embodiments the semipermeable membrane and separation method independently are characterizable as having or exhibiting a pure $N_2$ gas permeability in some embodiments of ≤20 barrer; ≤10 barrer; or ≤5 barrer. While it might be desirable to have higher pure $CH_4$ gas permeability under these conditions, in some embodiments the semipermeable membrane and separation method independently are characterizable as having or exhibiting a pure $CH_4$ gas permeability in some embodiments of ≤20 barrer; ≤15 barrer; or ≤9 barrer.

In some embodiments the separation is characterized by a gas selectivity. Gas selectivity is a unitless comparison between gas permeabilities (or between gas permeance or gas fluxes) of at least two different gases, wherein the gas permeabilities are determined with the same semipermeable material. In some embodiments the gas selectivity is determined by comparing pure or mixed gas permeabilities that are determined according to the pure or mixed gas permeability methods described later with an about 200 microns (μm) thick semipermeable membrane, at 35° C. and a gas feed pressure of 15 psig (103 kPa). In some embodiments the semipermeable membrane and separation method is characterizable as having a $CO_2/CH_4$ pure gas selectivity (i.e., greater permeability for $CO_2$ gas than for $CH_4$ gas) in some embodiments in order of increasing preference of >9; or ≥10.0. While preferably the $CO_2/CH_4$ pure gas selectivity is higher, in some embodiments the $CO_2/CH_4$ pure gas selectivity is in some embodiments <30; <20; or <15. In some embodiments the semipermeable membrane is characterizable as having a $CO_2/N_2$ pure gas selectivity (i.e., greater permeability for $CO_2$ gas than for $N_2$ gas) of ≥20, and preferably ≥25.0. While preferably the $CO_2/N_2$ pure gas selectivity is higher, in some embodiments the $CO_2/N_2$ pure gas selectivity is in some embodiments <50; <40; or <30. In some embodiments the semipermeable membrane and separation method independently are characterizable as having or exhibiting a mixed $CO_2/CH_4$ gas selectivity as follows: (a) using 50/50 (mol %/mol %) mixed $CO_2/CH_4$ gas and partial pressure of $CO_2$ gas of from 1 atm to 1.6 atm, mixed $CO_2/CH_4$ gas selectivity in some embodiments in order of increasing preference of ≥9.0; >9.0; or >10.

In some embodiments the semipermeable membrane is capable of functioning in the separation method to give a separation that is characterized by any one of the aforementioned gas permeabilities or, preferably, gas permeances with pure $CO_2$ gas, or gas selectivities for gas permeability of pure $CO_2$ gas over pure $CH_4$ gas ($CO_2/CH_4$); and wherein the semipermeable membrane, when comprising the crosslinked functional group-modified MSA material. independently is capable of functioning in such a way so as to inhibit $CO_2$ gas-induced plasticization thereof, wherein the $CO_2$ gas-induced plasticization is inhibited if $CO_2$ gas selectivity determined with 50/50 (mol %/mol %) mixed $CO_2/CH_4$ gases is at least 50% of $CO_2$ gas selectivity determined with corresponding pure $CO_2$ and pure $CH_4$ gas, wherein the mixed and pure gas selectivities are determined using the pure gas permeability method described herein and at the same temperature and pressure and acid gas partial pressure is 1 atmosphere (101 kPa).

Materials and Methods

Reagents were purchased or are commercially available.

Solution casting method: mix a sample (5 g) of material to be solution cast in 20 mL of chloroform to give a solution after about 20 minutes. Alternatively, prepare the material in situ dissolved in chloroform. Pour the solution into a clean, dry, level poly(tetrafluoroethylene)-coated Petri dish, cover with another such Petri dish, and allow the mixture to dry at ambient temperature (typically 23° C. to 25° C.) and pressure (typically 101 kilopascals) in a fume hood so as to give a dry solution cast film (test plaque) after 18 hours.

Pure gas permeability and selectivity apparatus and method: use the constant-volume variable-pressure pure gas permeation apparatus as described in US 2010/0126341 A1 (see FIG. 2 and paragraph [0102] thereof). The gas permeation cell (Stainless Steel In-Line Filter Holder, 47 millimeters (mm), catalog number XX45 047 00); Millipore Corporation, Billerica, Mass., USA), which is disposed in the vented oven of the apparatus, comprises a horizontal metal mesh support and a spaced-apart inlet and outlet respectively above and below the metal mesh support. Horizontally dispose a solution cast film to be tested (test plaque) on the metal mesh support. Thickness of the solution cast film is 200 microns plus-or-minus 30 microns (200 μm±30 μm, i.e., from 170 μm to 230 μm) unless otherwise noted. The test plaque separates the gas permeation cell into an upstream volume and a downstream volume. The inlet is in sequential fluid communication with the upstream volume, entrance face of the test plaque, exit face of the test plaque, downstream volume, and outlet. Expose the test plaque to vacuum for at least 16 hours at 35° C. prior to testing. After vacuum exposure, determine a leak rate by isolating the cell by closing both the upstream and downstream volumes to vacuum and feed gases. Determine a rate of pressure increase over a period of 5 minutes after the cell has been isolated for at least one hour. Acceptable leak rates are approximately $2 \times 10^{-5}$ Torr per second (0.003 pascal per second) or less. After an acceptable leak rate has been obtained, set temperature of vented oven to 35° C., and expose the resulting heated test plaque to $N_2$ gas at 15 pounds per square inch gauge (psig, 103 kilopascals (kPa)) pressure until the resulting rate of pressure increase, if any, has reached steady state (i.e., <0.5% change in pressure increase over a period of at least 10 minutes, but typically longer). Test the test plaque at an additional pressure of 45 psig (310 kPa) for determining permeation values at steady state. Obtain $CH_4$ gas and $CO_2$ gas steady state permeation values at 15 psig and 45 psig using the method as described for $N_2$ gas except replace the $N_2$ gas with the $CH_4$ gas or $CO_2$ gas, respectively. Between testing with the different gases, evacuate the upstream and downstream volumes in the cell using a vacuum pump for at least 16 hours at 35° C. Report pure gas permeability values in barrer. Calculate pure gas selectivities for $CO_2$ gas versus $CH_4$ gas or $N_2$ gas by dividing pure gas permeability value for $CO_2$ gas by the pure gas permeability value for $CH_4$ gas or $N_2$ gas.

Preparations 1, 2, 2a to 2d, 3, 4, and 5

Preparation 1: Preparation of the amide diol, ethylene-N, N"-dihydroxyhexanamide (C2C amide diol). Allow 1.2 kilogram (kg) ethylene diamine (EDA) to react with 4.56 kg of ε-caprolactone under a nitrogen gas blanket in a stainless steel reactor equipped with an agitator and a cooling water jacket. Observe temperature rises gradually to 80° C. A white deposit forms and the reactor contents solidify, so stop the stirring. Cool reactor contents to 20° C., and allow them to rest for 15 hours. Heat the reactor contents to 140° C. to form a melt thereof. Discharge the melt into a collecting tray and cool. $^1$H-NMR of the resulting crystalline C2C amide diol shows that molar concentration of C2C amide diol in the product exceeds 80; melting point (m.p.) 140° C. (The C2C amide diol as isolated is sufficiently pure that if desired it can be used directly to prepare premodification MSA material.) The C2C amide diol as isolated is recrystallized in proportions of about 97.5 grams C2C amide diol dissolved in hot 2-propanol (about 550 mL) to give a solution, which upon cooling results in recrystallized C2C amide diol. Collect crystals by filtration, rinse filtercake with 2-propanol, and dry to a constant weight in 70° C. vacuum oven to give purified C2C amide diol.

Preparation 2: Preparation of a premodification MSA material that is a polyesteramide having 18 mol % residuals of the C2C amide diol (PEA C2C18%). Stir under a nitrogen gas atmosphere titanium (IV) butoxide (0.192 gram (g). 0.56 millimole (mmol)), purified C2C amide diol (19.80 g, 68.66 mmol, Preparation 1), dimethyl adipate (66.45 g, 0.3815 mol), and 1,4-butanediol (62.56 g, 0.6942 mole (mol)) in a 1-neck 250 milliliter (mL) sized round bottom flask fitted with Vigreux column distillation head and heat in temperature-controlled salt bath at 160° C. for 45 minutes. Then raise bath temperature to a setpoint of 175° C. and hold for time of 75 minutes, change receiver with applying following vacuums, times: 450 Torr (60 kilopascals (kPa)), 5 minutes; 100 Torr (13 kPa), 5 minutes; 50 Torr (6.7 kPa), 5 minutes; 40 Torr (5.2 kPa), 5 minutes; 30 Torr (3.9 kPa), 5 minutes; 20 Torr (2.6 kPa), 5 minutes; 10 Torr (1.3 kPa), 90 minutes. Change receiver and place apparatus under full vacuum of about 0.3 Torr at 175° C. for a total of 2 hours. Cool flask contents to give the PEA C2C18% having an Inherent Viscosity=0.19 deciliters per gram (dL/g; chloroform/methanol (1/1, weight per weight (wt/wt)); 30.0° C.; 0.5 g/dL). $^1$H-NMR (d4-acetic acid) $M_n$ is 4017 g/mol. The $M_n$ is determined with a 5 wt % solution of PEA C2C18% in d4-acetic acid using proton NMR with peak assignments and integration values as follows: —C(O)—OCH$_2$—, about 3.9 ppm to about 4.25 ppm, integration value 1.00; —CH$_2$OH, about 3.6 ppm to about 3.75 ppm, integration value 0.056; —CH$_2$N—, about 3.25 ppm to about 3.5 ppm, integration value 0.180; —CH$_2$C(O)—, about 2.15 ppm to about 2.5 ppm, integration value 1.188; and —CCH$_2$C—, about 1.15 ppm to about 1.9 ppm, integration 2.488. With the sum of the mole fraction of amide containing repeat units and non-amide containing repeat units equaling 1 and by taking the number of protons of each of the aforementioned protons type (excluding those associated with the CH$_2$OH end group) for amide and non-amide containing repeat units, the integration ratio of CH$_2$N against the other 3 types of protons in the repeat units leads to a measured value of 17.6 mole % (18 mol %) of polymer repeat units containing amide diol residues which leads to an average molecular weight for a repeat unit being 235 g/mol. For $M_n$, the degree of polymerization (DP$_n$) is determined from the integration ratio of —CH$_2$C(O)— to CH$_2$OH and multiplied by the average molecular weight for a repeat unit leading to $M_n$ 4017 g/mol. Solution cast a comparative example film from a chloroform solution of the PEA C2C18%.

Preparations 2a and 2b: Replicate the foregoing procedure two times and monitor $M_n$ by NMR and stop reaction at $M_n$ about 4700 g/mol or 2200 g/mol to respectively prepare additional PEA C2C18% except with a $M_n$ of 4790 g/mol or 2320 g/mol of Preparations 2a and 2b, respectively. (e.g., placing under the full vacuum of about 0.3 Torr at 175° C. hold with monitoring by NMR for more than the 2 hours before cooling to give $M_n$ of 4790 g/mol or immediately after placing under the full vacuum of about 0.3 Torr at 175° C. monitor $M_n$ by NMR to give $M_n$ of 2320 g/mol).

Preparation 2c: Replicate the foregoing procedure another time except use only 10.9 g of purified C2C amide to give the PEA C2C10% with a $M_n$ of 2720 g/mol of Preparation 2c.

Preparation 2d: Replicate the procedure of Preparation 2 except after applying full vacuum of about 0.3 Torr at 175° C. for a total of 2 hours, further apply full vacuum of 2 hours to/at 190° C.; and 3 hours to/at 210° C. Cool the contents of the flask to room temperature and grind them to give the PEA-C2C18%. Inherent viscosity=0.32 deciliters per gram (dL/g; chloroform/methanol (1/1, weight per weight (wt/wt)); 30.0° C.; 0.5 g/dL). $^1$H-NMR (d4-acetic acid): $M_n$ from end groups is 11,700 g/mol and 17.3 mole % of polymer repeat units contain C2C amide diol residuals.

Preparation 3: Preparation of a premodification MSA material that is a polyetheresteramide having a calculated composition of 27.3 wt % butylene adipate repeat units, 34.4 wt % C2C diamide diol adipate, 23.3 wt % poly(ethylene glycol-block-propylene glycol-block-polyethylene glycol adipate repeat units, and 15.0 wt % polyethylene glycol adipate repeat units (PBA/PC2CA/P(PPO)A/PEGA, 27.3/34.4/23.3/15). Stir under a nitrogen gas atmosphere titanium (IV) butoxide (0.083 gram (g), 0.24 millimole (mmol)), purified C2C amide diol (18.67 g, 64.74 mmol, Preparation 1), poly (ethylene glycol-block-poly(propylene glycol)-block-poly (ethylene glycol), 10 wt % polyethylene glycol, $M_n$ 2800 g/mol (16.81 g, 6.00 mmol), CARBOWAX™ Sentry polyethylene glycol 600 NF, $M_n$ 621 g/mol (9.56 g, 15.4 mmol), dimethyl adipate (32.82 g, 0.1884 mol), and 1,4-butanediol (17.68 g, 0.1965 mole (mol)) in a 1-neck 250 milliliter (mL) sized round bottom flask fitted with Vigreux column distillation head and heat in a temperature-controlled salt bath at 160° C. for 45 minutes. Then raise bath temperature to a setpoint of 175° C. and hold for time of 70 minutes, change receiver with applying following vacuums, times: 450 Torr (60 kilopascals (kPa)), 5 minutes; 100 Torr (13 kPa), 5 minutes; 50 Torr (6.7 kPa), 5 minutes; 40 Torr (5.2 kPa), 5 minutes; 30 Torr (3.9 kPa), 5 minutes; 20 Torr (2.6 kPa), 5 minutes; 10 Torr (1.3 kPa), 125 minutes. Change receiver and place apparatus under full vacuum of about 0.5 Torr at 175° C. for a total of 2.1 hours. Cool flask contents to give the polyetheresteramide of Preparation 3 having an Inherent Viscosity=0.22 deciliters per gram (dL/g; chloroform/methanol (1/1, weight per weight (wt/wt)); 30.0° C.; 0.5 g/dL). By carbon-13 NMR, $M_n$ is 4974 g/mol.

Preparation 4: preparing dimethyl ester of 6,6'-(1,2-ethanediyldiimino)bis[6-oxo-hexanoic acid] ("A2A diamide diester")

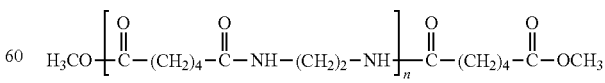

Stir under a nitrogen gas atmosphere titanium (IV) butoxide (0.92 g, 2.7 mmol), ethylene diamine (15.75 g, 0.262 mol), and dimethyl adipate (453.7 g, 2.604 mol) in a 3-neck, 1 L round bottom flask and heat as follows: 2.0 hours to/at 50° C.; then 2.0 hours to/at 60° C.; then 2.0 hours to/at 80° C.; and then overnight at 100° C. Cool flask to room temperature. Add approximately 200 mL of cyclohexane to the reaction flask with agitation to give a slurry; filter and collect. (a) Wash filtercake with about 50 mL of cyclohexane, then triturate with about 320 mL cyclohexane, refilter, and rewash second filter cake with about 50 mL cyclohexane. Dry solids overnight in a 50° C. vacuum oven. (b) Repeat (a) and dry solids to constant weight in a 50° C. vacuum oven under full pump vacuum to give 54.2 grams of the A2A diamide diester of Preparation 4 (lacks unreacted dimethyl adipate), wherein n is approximately 1.

Preparation 5: preparing a premodification MSA material that is a polyesteramide having calculated composition of 69.6 wt % butylene adipate repeat units and 30.4 wt % butylene A2A repeat units (PBA/PBA2A, 69.9/30.4), Stir under a nitrogen gas atmosphere titanium (IV) butoxide (0.131 gram (g). 0.385 millimole (mmol)), A2A diamide diester (16.95 g, 49.21 mmol, Preparation 4), dimethyl adipate (36.33 g, 0.2086 mol), and 1,4-butanediol (34.84 g, 0.3866 mole (mol)) in a 1-neck 250 milliliter (mL) sized round bottom flask equipped with Vigreux column distillation head and heat in a temperature-controlled salt bath at 160° C. with bath temperature raised to a setpoint of 175° C. for total time of 1.9 hours. Change receiver with applying following vacuums, times: 450 Torr (60 kilopascals (kPa)), 5 minutes; 100 Torr (13 kPa), 5 minutes; 50 Torr (6.7 kPa), 10 minutes; 40 Torr (5.2 kPa), 10 minutes; 30 Torr (3.9 kPa), 10 minutes; 20 Torr (2.6 kPa), 10 minutes; 10 Torr (1.3 kPa), 90 minutes. Change receiver and place apparatus under full vacuum of about 0.3 Torr at 175° C. for a total of 2 hours. Cool flask contents to give the polyesteramide of Preparation 5 having an Inherent Viscosity=0.22 dL/g; chloroform/methanol (1/1, weight per weight (wt/wt)); 30.0° C.; 0.5 g/dL). $M_n$ is 5110 g/mol ($^1$H-NMR).

Non-limiting examples of the present invention are described below that illustrate some specific embodiments and aforementioned advantages of the present invention. Preferred embodiments of the present invention incorporate one limitation, and more preferably any two, limitations of the Examples, which limitations thereby serve as a basis for amending claims.

Examples A1 to A5, A6a, A6b, A6c, A7a, A7b, and A8

Example A1

Preparing a reactive silane-modified polyesteramide from PEA C2C18%. Into a silylated 3-neck, 250 mL round bottom flask with nitrogen gas pad load a magnetic stir-bar, anhydrous chloroform (amylene stabilized, 120 mL), and dry PEA C2C18 from Preparation 2 (17.11 gram). Upon dissolution, inject dibutyltindilaurate (0.032 mL) into the flask. Fit flask with a Dean-Stark type trap and condenser. Heat and distill about 20 mL of chloroform into the trap, and drain the distillate from the trap and discard it. Upon cooling to ambient temperature, inject 3-isocyanatopropyltriethoxysilane (2.24 mL, 9.0 mmol $(CH_3CH_2O)_3SiCH_2CH_2CH_2NCO$) into the flask. Follow reaction progress by Fourier Transform Infrared (FT-IR) spectroscopy for 68 hours to give a solution of the reactive silane-modified polyesteramide as the reactive silane-modified PEA C2C18% of Example A1 dissolved in chloroform. Remove an aliquot of the solution and evaporate the chloroform so as to isolate some of the reactive silane-modified PEA C2C18%.

Example A2

Preparing a reactive silane-modified polyetheresteramide from PBA/PC2CA/P(PPO)A/PEGA, 27.3/34.4/23.3/15). Replicate Example A1 except using dry PBA/PC2CA/P (PPO)A/PEGA from Preparation 3 (17.11 gram) instead of the PEA C2C18 from Preparation 2 and 1.70 g instead of 2.24 mL of isocyanatopropyltriethoxysilane $(CH_3CH_2O)_3SiCH_2CH_2CH_2NCO$) prepare a solution of the reactive silane-modified PBA/PC2CA/P(PPO)A/PEGA of Example A2 dissolved in chloroform and isolate some of the reactive silane-modified PBA/PC2CA/P(PPO)A/PEGA.

Example A3

Preparing a reactive silane-modified polyesteramide from PBA/PBA2A, 69.6/30.4. Replicate Example A1 except using dry PBA/PBA2A from Preparation 5 (17.11 gram) instead of the PEA C2C18 from Preparation 2 and 1.76 mL instead of 2.24 mL of isocyanatopropyltriethoxysilane $(CH_3CH_2O)_3SiCH_2CH_2CH_2NCO$) prepare a solution of the reactive silane-modified PBA/PBA2A of Example A3 dissolved in chloroform and isolate some of the reactive silane-modified PBA/PBA2A.

Example A4

Preparing a reactive epoxy-modified polyesteramide from PEA C2C18%. Replicate the procedure of Example A1 except use epichlorohydrin (4.5 mmol, $(C_2H_3O)$—$CH_2Cl$) and potassium tertiary-butoxide (4.5 mmol) instead of $(CH_3CH_2O)_3SiCH_2CH_2CH_2NCO$ to give a solution of the reactive epoxy-modified PEA C2C18% of Example A4 dissolved in chloroform. Evaporate the chloroform so as to isolate the reactive epoxy-modified PEA C2C18%.

Example A5

Preparing a reactive methacrylate-modified polyesteramide from PEA C2C18%. Replicate the procedure of Example A1 except use 2-isocyanatoethyl methacrylate (1.01 mL, 7.14 mmol, $CH_2$=$C(CH_3)C(O)OCH_2CH_2NCO$) instead of $(CH_3CH_2O)_3SiCH_2CH_2CH_2NCO$ and utilize the PEA C2C18% of Preparation 2a with a $M_n$ of 4790 g/mol to give a solution of the reactive methacrylate-modified PEA C2C18% of Example A5 dissolved in chloroform. Evaporate the chloroform so as to isolate the reactive methacrylate-modified PEA C2C18%.

Examples A6a to A6c

Preparing a reactive isocyanato-modified polyesteramide from PEA C2C18%. To a solution of 10 g PEA C2C18 from Preparation 2b with a $M_n$ of 2320 g/mol in anhydrous tetrahydrofuran (THF) under $N_2$ gas atmosphere add via syringe either: (A6a) ISONATE™ 125 M (2.163 g, 2 mole equivalents); (A6b) 2 mole equivalents PAPI™ 27; or 2 mole equivalents PAPI™ 94. Monitor disappearance of HO—stretch band by IR spectroscopy to give a solution of the reactive isocyanate-modified PEA C2C18% of Example A6a, A6b, or A6c, respectively, dissolved in THF. Separately evaporate the THF from the solutions from a Petri dish coated with poly(tetrafluoroethylene), and dry overnight under vacuum at 50° C. so as to isolate and dry the reactive isocyanato-modified PEA C2C18% of Example A6a, A6b, and A6c, respectively.

Examples A1a and A1b

Separately preparing a reactive methacrylate-modified polyester amide from PEA C2C18%. To a solution of 10 g PEA C2C18 from Preparation 2b with the $M_n$ of 2320 g/mol or Preparation 2d with the $M_n$ of 11,700 g/mol in anhydrous tetrahydrofuran (THF) under $N_2$ gas atmosphere add via syringe isocyanatoethyl methacrylate (about a molar stoichiometry of capping agent to the $CH_2OH$ endgroups of the MSA material). Monitor disappearance of —N=C=O band by IR spectroscopy to respectively give a solution of the reactive methacrylate-modified polyester amide from PEA C2C10% of Example A7a or A7b dissolved in THF. Add a photoacid generator (triphenylsulfonium hexafluorophosphane, $(C_6H_5)_3SPF_6$), and evaporate the THF from a Petri dish coated with poly(tetrafluoroethylene), and dry overnight under vacuum at 50° C. so as to isolate the reactive methacrylate-modified PEA C2C18% of Example A7a or A7b containing $(C_6H_5)_3SPF_6$.

Example A8

Replicate Example A7a except replace the PEA-C2C18% of Preparation 2b with the PEA-C2C10% of Preparation 2c to give the reactive methacrylate-modified polyester amide from PEA C2C10%.

Examples B1 to B6, B7a, B7b, B8, and B9

Examples B1 to B5

Shaping the products of respective Examples A1 to A5 to give films. Separately cast aliquots of the solutions of Example A1, A2, A3, A4, and A5 as a film, and evaporate chloroform to give respectively a film comprising the reactive silane-modified PEA C2C18% (Example A1), a film comprising the reactive silane-modified PBA/PC2CA/P(PPO)A/PEGA (Example A2), a film comprising the reactive silane-modified PBA/PBA2A (Example A3), a film comprising the reactive epoxy-modified PEA C2C18% (Example A4), and a film comprising the reactive methacrylate-modified PEA C2C18% (Example A5). Each film independently is soluble in chloroform and chloroform/methanol.

Separately expose the films of Examples A1 to A3 to water vapor at 50° C. for 60 hours so as to crosslink their reactive silane functional groups to give a film comprising a crosslinked silane-modified PEA C2C18%, a film comprising a crosslinked silane-modified PBA/PC2CA/P(PPO)A/PEGA, and a film comprising a crosslinked silane-modified PBA/PBA2A. Each film independently is insoluble in chloroform and chloroform/methanol.

Example B6

Shaping and curing the product of Example A6a to give a film. Compression mold the reactive isocyanato-modified PEA C2C18% of Example A6a under anhydrous atmosphere using an automatic tetrahedron press, keeping plates at 120° C. (for PEA-C2C18%) or 150° C. (for PEA-C2C10%) under the compression molding conditions listed below in Table 1.

TABLE 1 compression molding conditions (kLB is kilopounds)

| Step Number | Temperature (° F.)/(° C.) | Temperature Rate (° F./min) | Force (kLB) | Force Rate (kLB/min) | Time (min) |
|---|---|---|---|---|---|
| 1 | 248° F. (120° C.) | 200° F./min (93° C./min) | 0.5 | 1 | 1 |
| 2 | 248° F. | 200° F./min | 20 | 20 | 3 |
| 3 | 100° F. (38° C.) | 200° F./min | 20 | 20 | 4 |

The compression molding gives 0.015 inch (380 microns) thick film. Cure film in water for from 48 hours to 72 hours, and dry the cured film in a vacuum oven to remove residual water to give a crosslinked PEA C2C18%.

Examples B7a, B7b, B8, B9

Shaping and curing the product of Example A7a, A7b, or A8 or A5 to give a film. Separately replicate the compression molding procedure of Example B6 except use the reactive methacrylate-modified PEA C2C18% of Example A7a or A7b or the reactive methacrylate-modified PEA C2C10% of Example A8, or the reactive methacrylate-modified PEA C2C18% of Example A5 (each containing $(C_6H_5)_3SPF_6$) instead of the reactive isocyanato-modified PEA C2C18% of Example A6 to give a 0.015 inch (380 microns) thick film. Cure the films by passing it three times through UV light (e.g., generated by lamp SPECTROLINKER™ XL-1000 UV Crosslinker, Spectronics Corporation and intensity=1.9 microwatt per square centimeter ($\mu W/cm^2$)), and then allow the UV exposed film to cure overnight under ambient conditions to respectively give a crosslinked PEA C2C18% of Example B7a or B7b or a crosslinked PEA C2C10% of Example B8 or the crosslinked PEA C2C18% of Example B9.

Examples 1 to 6

Example 1

Separately measure pure gas transport of the PEA C2C18% film of Preparation 2 (comparator example) and the reactive silane-modified PEA C2C18% film of Example B1 with pure gases: $N_2$ gas, $CO_2$ gas, and $CH_4$ gas, at 35° C. and a gas feed pressure of 15 pounds per square inch gauge (psig, 103 kPa). Determine that pure gas selectivity for flux of $CO_2$ gas versus flux of $N_2$ gas or $CH_4$ gas is higher for the film of Example B1 than the PEA C2C18% film.

Example 2

Contact the chloroform solution of the reactive isocyanato-modified PEA C2C18% of Example A6b with eicosinol (a $(C_{20})$ fatty alcohol) at 60° C. for 2 days to give an end-capped derivatized MSA material. The end-capped derivatized MSA material is expected to be useful for forming a semipermeable film with a lower $T_m$ than $T_m$ of the PEA C2C18%.

Example 3

Contact the chloroform solution of the reactive isocyanato-modified PEA C2C18% of Example A6c with the CARBOWAX™ Sentry polyethylene glycol 600 NF, $M_n$ 621 g/mol at 60° C. for 2 days to give a chain extended MSA material comprising a derivatized functional group. The chain extended MSA material is expected to be useful for forming a semipermeable film with higher pure gas selectivity for flux of $CO_2$ gas versus flux of $N_2$ gas or $CH_4$ gas than the PEA C2C18% film of Preparation 2.

Example 4

Prepare a crosslinked bisamide-modified PEA C2C18%. Heat and stir under a nitrogen gas atmosphere the isolated reactive isocyanato-modified PEA C2C18% of Example A6b with 0.45 mole equivalents of water in temperature-controlled salt bath at 160° C. for 45 minutes. Then raise bath temperature to a setpoint of 175° C. and hold for time of 75 minutes, change receiver with applying following vacuums, times: 450 Torr (60 kilopascals (kPa)), 5 minutes; 100 Torr (13 kPa), 5 minutes; 50 Torr (6.7 kPa), 5 minutes; 40 Torr (5.2 kPa), 5 minutes; 30 Torr (3.9 kPa), 5 minutes; 20 Torr (2.6 kPa), 5 minutes; 10 Torr (1.3 kPa), 90 minutes. Change receiver and place apparatus under full vacuum of about 0.3 Torr at 175° C. for a total of 2 hours. Cool flask contents to give a crosslinked bisamide-modified PEA C2C18% of Example 4.

Examples 5 and 6

Separately measure mixed gas transport properties an uncured reactive methacrylate-modified PEA C2C18% film (prepared below) or crosslinked methacrylate-modified PEA C2C18% film of Example B9 with $CO_2/CH_4$ (50 mol %/50 mol %) mixed gas, at 35° C. and a gas feed pressure of 15 pounds per square inch gauge (psig, 103 kPa) or 150 psig (1030 kPa) for 1 day exposure. Solution cast a film of the reactive methacrylate-modified PEA C2C18% of Example A5 to give the uncured reactive methacrylate-modified PEA C2C18% film. Determine that mixed gas selectivity for flux of $CO_2$ gas is higher than for flux of $CH_4$ gas for the uncured reactive methacrylate-modified PEA C2C18% film ($CO_2/CH_4$ selectivity 7.8 (15 psig) and 5.5 (150 psig)) and for the film of Example B9 ($CO_2/CH_4$ selectivity 5.4 (15 psig) and 4.4 (150 psig)).

The $CO_2$ gas selectivities of the Example films show the films function as semipermeable membranes.

The present invention is described herein according to its preferred advantages, embodiments and features (e.g., preferred selections, ranges, constituents, elements, steps, examples, and other preferred features). However, the intent of this description is not to limit the present invention to the particular preferred advantages, embodiments and features so described, but to also cover, and the present invention does cover, any and all advantages, modifications, equivalents, variations, adaptations, and alternatives falling within the spirit and scope of the description. Thus, characterizations of such embodiments and features as "preferred" should in no way be interpreted as designating such advantages, embodiments and features as being required, essential or critical to the present invention described herein, including the aspects thereof hereupon claimed.

What is claimed is:

1. A reactive functional group-modified molecularly self-assembling material comprising at least one reactive functional group covalently bonded to a molecularly self-assembling (MSA) material; Wherein each reactive functional group is supplementary to the MSA material and independently is derived from a reaction of a premodification MSA material with a polyfunctional reactant comprising first- and second-reacting functional groups, wherein the reaction has formed the covalent bond between the premodification MSA material and the first-reacting functional group of the polyfunctional reactant; and the polyfunctional reactant is not the premodification MSA material or a monomer therefor; Wherein the premodification MSA material is an oligomer or polymer comprising repeat units of formula I:

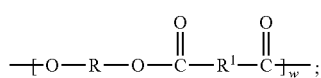

and at least one second repeat unit selected from the group consisting of the ester-amide repeat units of Formula II and III and V:

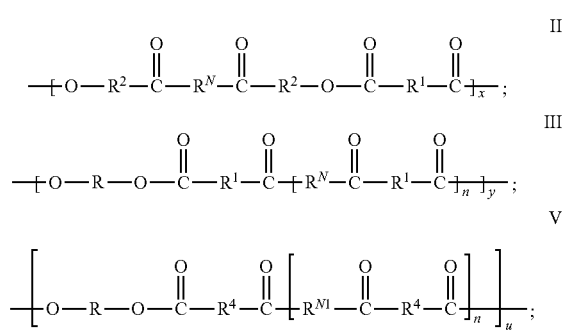

and the ester-urethane repeat unit of Formula IV:

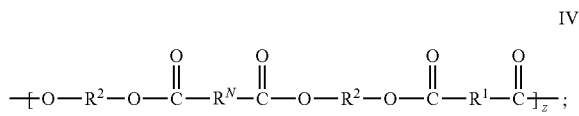

or combinations thereof; wherein:
R is at each occurrence, independently a non-aromatic ($C_2$-$C_{20}$)hydrocarbylene group, a non-aromatic ($C_2$-$C_{20}$)heterohydrocarbylene group, or a polyalkylene oxide group having a group molecular weight of from about 100 grams per mole to about 5000 grams per mole;
$R^1$ at each occurrence independently is a bond or a non-aromatic ($C_1$-$C_{20}$)hydrocarbylene group or an aromatic ($C_6$-$C_{20}$)hydrocarbylene group or a phenylene[het]-phenylene wherein [het] independently is a heteroatom linker O, S, S(O), S(O)$_2$, or N($R^3$);
$R^2$ at each occurrence independently is a non-aromatic ($C_1$-$C_{20}$)hydrocarbylene group;
$R^N$ is —N($R^3$)—Ra—N($R^3$)—, where $R^3$ at each occurrence independently is H or a ($C_2$-$C_6$)alkyl and Ra is a non-aromatic ($C_2$-$C_{20}$)hydrocarbylene group, or $R^N$ is a ($C_2$-$C_{20}$)heterocycloalkyl group containing the two nitrogen atoms, wherein each nitrogen atom is bonded to a carbonyl group according to formula (III) above;
$R^{N1}$ is —N($R^3$)—Rb—N($R^3$)—, where $R^3$ at each occurrence independently is H or a ($C_1$-$C_6$)alkyl, and Rb is an aromatic ($C_6$-$C_{20}$)hydrocarbylene group or non-aromatic ($C_2$-$C_{20}$)hydrocarbylene group or a phenylene [het]-phenylene wherein [het] is as defined above; or $R^{N1}$ is a ($C_2$-$C_{20}$)heterocycloalkylene group containing two ring nitrogen atoms that are bonded to different carbonyl groups in formula (V);
$R^4$ at each occurrence independently is an aromatic ($C_6$-$C_{20}$)hydrocarbylene group;
n is at least 1 and has a mean value less than 3; and
w represents the ester mol fraction of Formula I, and u, x, y and z represent the amide or urethane mole fractions of Formulas V, II, III, and IV, respectively, where w+u+x+y+z=1, and 0<w<1, and at least one of u, x, y and z is greater than zero but less than 1; wherein the oligomer or polymer comprises at least one active hydrogen-containing functional group comprising a $CH_2OH$ group, C—N(H)—C group, or C—$NH_2$ group, wherein an active hydrogen atom of the active hydrogen-containing functional group is replaced in the reaction by the residual from the polyfunctional reactant; and
wherein each reactive functional group is a reactive-(non-silane) functional group, wherein each reactive-(non-silane) functional group independently is of formula (N); Q-Z—(N), wherein Q is O=C=N—; $H_2C=$ (H)—; ($C_1$-$C_{10}$)alkyl-substituted vinyl; epoxy; or ($C_3$-$C_6$)lactonyl; and Z is a covalent bond, ($C_1$-$C_{40}$)hydrocarbylene, or ($C_1$-$C_{40}$)heterhydrocarbylene.

2. A reactive functional group-modified molecularly self-assembling material comprising:

at least one reactive functional group covalently bonded to a molecularly self-assembling (MSA) material; Wherein each reactive functional group is supplementary to the MSA material and independently is derived from a reaction of a premodification MSA material with a polyfunctional reactant comprising first- and second-reacting functional groups, wherein the reaction has formed the covalent bond between the premodification MSA material and the first-reacting functional group of the polyfunctional reactant; and the polyfunctional reactant is not the premodification MSA material or a monomer therefor; Wherein the premodification MSA material is an oligomer or polymer comprising repeat units of formula I:

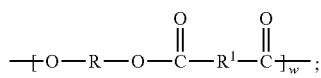

and at least one second repeat unit selected from the group consisting of the ester-amide repeat units of Formula II and III and V:

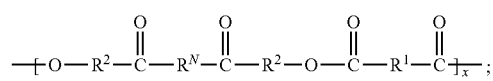

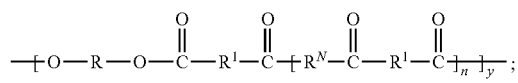

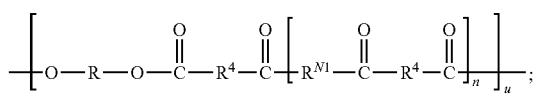

and the ester-urethane repeat unit of Formula IV:

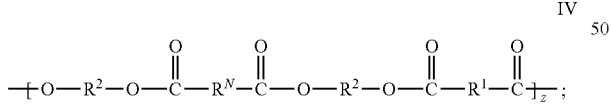

or combinations thereof; wherein:

R is at each occurrence, independently a non-aromatic ($C_2$-$C_{20}$)hydrocarbylene group, a non-aromatic ($C_2$-$C_{20}$)heterohydrocarbylene group, or a polyalkylene oxide group having a group molecular weight of from about 100 grams per mole to about 5000 grams per mole;

$R^1$ at each occurrence independently is a bond or a non-aromatic ($C_1$-$C_{20}$)hydrocarbylene group or an aromatic ($C_6$-$C_{20}$)hydrocarbylene group or a phenylene-[het]-phenylene wherein [het] independently is a heteroatom linker O, S, S(O), S(O)$_2$, or N($R^3$);

$R^2$ at each occurrence independently is a non-aromatic ($C_1$-$C_{20}$)hydrocarbylene group;

$R^N$ is —N($R^3$)—Ra—N($R^3$)—, where $R^3$ at each occurrence independently is H or a ($C_2$-$C_6$)alkyl and Ra is a non-aromatic ($C_2$-$C_{20}$)hydrocarbylene group, or $R^N$ is a ($C_2$-$C_{20}$)heterocycloalkyl group containing the two nitrogen atoms, wherein each nitrogen atom is bonded to a carbonyl group according to formula (III) above;

$R^{N1}$ is —N($R^3$)—Rb—N($R^3$)—, where $R^3$ at each occurrence independently is H or a ($C_1$-$C_6$)alkyl, and Rb is an aromatic ($C_6$-$C_{20}$)hydrocarbylene group or non-aromatic ($C_1$-$C_6$)hydrocarbylene group or a phenylene-[het]-phenylene wherein [het] is as defined above; or $R^{N1}$ is a ($C_2$-$C_{20}$)heterocycloalkylene group containing two ring nitrogen atoms that are bonded to different carbonyl groups in formula (V);

$R^4$ at each occurrence independently is an aromatic ($C_6$-$C_{20}$)hydrocarbylene group;

n is at least 1 and has a mean value less than 3; and w represents the ester mol fraction of Formula I, and u, x, y and z represent the amide or urethane mole fractions of Formulas V, II, III, and IV, respectively, where w+u+x+y+z=1, and 0<w<1, and at least one of u, x, y and z is greater than zero but less than 1; wherein the oligomer or polymer comprises at least one active hydrogen-containing functional group comprising a $CH_2OH$ group, C—N(H)—C group, or C—$NH_2$ group, wherein an active hydrogen atom of the active hydrogen-containing functional group is replaced in the reaction by the residual from the polyfunctional reactant;

wherein the premodification molecularly self-assembling material comprised repeat units of formula I and at least one second repeat unit selected from the group consisting of the ester-amide repeat units of Formula II and III and the ester-urethane repeat units of Formula IV, or combinations thereof; wherein: $R^1$ at each occurrence independently is a bond or a non-aromatic ($C_1$-$C_{20}$) hydrocarbylene group; n is at least 1 and has a mean value less than 2; and w represents the ester mol fraction of Formula I, and x, y and z represent the amide or urethane mole fractions of Formulas II, III, and IV, respectively, where w+x+y+=1, and 0<w<1, and at least one of x, y and z is greater than zero but less than 1; and wherein the premodification MSA material is characterized by a number average molecular weight of from 1000 grams per mole to 50,000 grams per mole; and wherein the polymer or oligomer is of the formula:

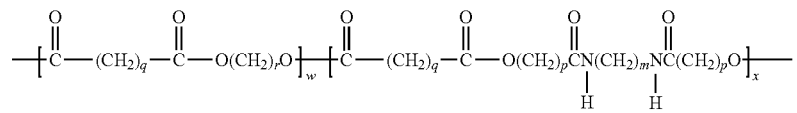

wherein p and r independently are 2, 3, 4, 5, 6 or 8; q independently is an integer of from 0 to 10; m is from 2 to 6; or the polymer or oligomer is of any one of the formulas:

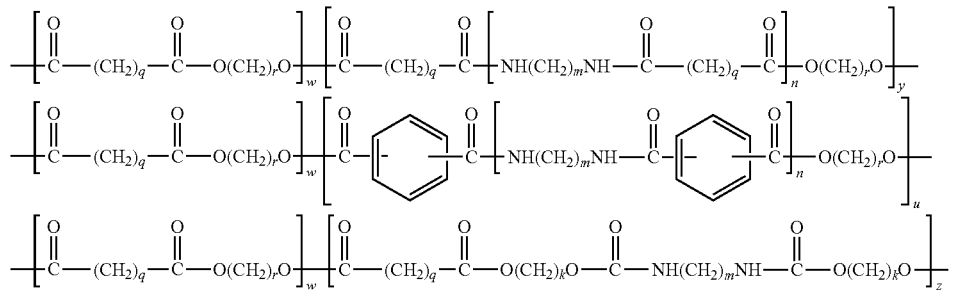

wherein q is independently from 0 to 10, and r is independently 2, 3, 4, 5, 6 or 8; m is from 2 to 6; n is at least 1 and has a mean value less than 3, k is independently 2, 3 or 4; and the number average molecular weight of the polymer or oligomer, before covalent bonding to the halosilyl or oxy-silyl containing functional group, is from 1000 g/mol to 30,000 g/mol.

3. A manufactured article comprising a shaped reactive functional group-modified MSA material, the reactive functional group-modified MSA material being as in claim 1, wherein the shaped reactive functional group-modified MSA material of the manufactured article comprises a semipermeable membrane having spaced-apart entrance and exit faces, wherein the semipermeable membrane contains an acid gas separating effective amount of the reactive functional group-modified MSA material, wherein the semipermeable membrane is capable of functioning in such a way so as to separate at least some acid gas from a separable gas mixture comprising the acid gas and at least one permeation-resistant gas.

4. A separation method of separating an acid gas from a separable gas mixture comprising the acid gas and at least one permeation-resistant gas, the method comprising contacting the entrance face (upstream) of the semipermeable membrane as in claim 3 with the separable gas mixture; allowing a first permeant gas portion of the separable gas mixture to pass through the semipermeable membrane and preventing a permeation resistant gas portion of the separable gas mixture from passing therethrough; and removing a first permeant gas from the exit face of the semipermeable membrane, wherein the first permeant gas comprises at least some of the acid gas from the separable gas mixture, the first permeant gas thereby being enriched in the acid gas compared to the separable gas mixture.

5. The separation method as in claim 4, wherein the separable gas mixture comprises a flue gas or natural gas and the acid gas comprises $CO_2$ gas.

6. A shaping process for preparing the manufactured article as in claim 3, the shaping process comprising shaping a melt (optionally containing a liquid plasticizer) of the reactive functional group-modified MSA material or derivatized MSA product or shaping a solution of the reactive functional group-modified MSA material or derivatized MSA product dissolved in a solvent to respectively give a shaped melt or shaped solution of the reactive functional group-modified MSA material or derivatized MSA product, and allowing the shaped melt to solidify or the liquid plasticizer or solvent to separate out so as to prepare the manufactured article.

7. A process for preparing a crosslinked reactive functional group-modified MSA material, the process comprising contacting the reactive functional group-modified MSA material as in claim 1 under curing effective conditions with a crosslinking effective amount of a promoter in such a way so as to crosslink molecules of the reactive functional group-modified MSA material and prepare the crosslinked functional group-modified MSA material.

* * * * *